US012513480B2

(12) United States Patent
Chen

(10) Patent No.: US 12,513,480 B2
(45) Date of Patent: Dec. 30, 2025

(54) METHOD FOR MANUFACTURING LOUDSPEAKER HAVING WIRE DAMPER WITH LOCALLY ADJUSTABLE ELASTICITY

(71) Applicant: Vincent Chen, Taipei (TW)

(72) Inventor: Vincent Chen, Taipei (TW)

( * ) Notice: Subject to any disclaimer, the term of this patent is extended or adjusted under 35 U.S.C. 154(b) by 400 days.

(21) Appl. No.: 18/095,152

(22) Filed: Jan. 10, 2023

(65) Prior Publication Data

US 2023/0164505 A1 May 25, 2023

Related U.S. Application Data

(63) Continuation-in-part of application No. 17/107,960, filed on Dec. 1, 2020, now abandoned.

(51) Int. Cl.

| | |
|---|---|
| ***H04R 31/00*** | (2006.01) |
| ***H04R 1/06*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ............. *H04R 31/006* (2013.01); *H04R 1/06* (2013.01); *H04R 9/043* (2013.01); *H04R 9/06* (2013.01); *H04R 9/025* (2013.01)

(58) Field of Classification Search
None
See application file for complete search history.

(56) References Cited

U.S. PATENT DOCUMENTS

2002/0034315 A1* 3/2002 Auerbach ................ H04R 1/06 381/409
2006/0159300 A1* 7/2006 Ohara .................... H04R 9/043 381/404
2007/0189576 A1* 8/2007 Chan ........................ H04R 9/06 381/396
2016/0037264 A1* 2/2016 Danovi .................. H04R 9/043 381/404

* cited by examiner

*Primary Examiner* — Shawn Mckinnon

(57) ABSTRACT

A method for manufacturing a loudspeaker having a wire damper with locally adjustable elasticity, including preparation, impregnating, drying, wire disposing, forming, cutting and assembling steps. Wherein, a wire damper including a main body and a wire is thermoformed on a base material. The main body includes a wave structure and a wire disposing area. The wave structure includes wave crest and trough, and inner and outer sidewalls. The wire disposing area forms a hollow portion in which the wire extends. The warp yarns at outside and inside of the wire disposing area form an elastic adjustment area. The hollow portion has smaller depths at the inner and outer sidewalls than at the wave crests and troughs. Thereby, the wire will not be damaged by hot pressing, and the hardness, elasticity and toughness of the combination of the wire disposing area and the wire are equal to that of other areas.

4 Claims, 17 Drawing Sheets

METHOD FOR MANUFACTURING LOUDSPEAKER HAVING WIRE DAMPER WITH LOCALLY ADJUSTABLE ELASTICITY

CROSS-REFERENCE TO RELATED APPLICATION

This application is a continuation-in-part of U.S. patent application Ser. No. 17/107,960, filed on Dec. 1, 2020, which is incorporated herewith by reference.

BACKGROUND OF THE INVENTION

1. Field of the Invention

The present invention relates to a method for manufacturing a loudspeaker, and more particularly, to a method for manufacturing a loudspeaker having a wire damper with locally adjustable elasticity.

2. The Prior Arts

In the general moving coil loudspeaker, the principle that the reaction force of a fixed magnetic field causes another magnetic field to move in the opposite direction (i.e., opposite magnetisms attract each other, and like magnetisms repels each other) is used to produce sound. Further, the power alternating current generated by the power amplifier is transmitted to the voice coil through a wire to change the polarity of the magnetic field, such that the voice coil generates a reaction force against the fixed magnetic region generated by the magnetic circuit device. The forward pulse causes the diaphragm move outward relative to the magnet, while the backward pulse causes the diaphragm move inward. When the voice coil pushes the diaphragm to reciprocate, the diaphragm pushes air, and the air pressure changes to form sound waves. The damper is responsible for maintaining the correct position of the voice coil in the gap of the magnet core, ensuring that the voice coil reciprocates along the axis direction when being forced.

However, in the conventional loudspeaker, the wire is suspended in the air without any support, so that the wire alone bears the vibration force transmitted from the voice coil. Thereby, after the voice coil moves rapidly and frequently for a period of time, the wire is easy to fatigue and be broken.

In order to solve the above problems, in this industry, it has begun to develop the process of fixing the wires on the damper during the manufacturing procedure of the wire damper. First, a base material is impregnated in a liquid synthetic resin to allow the base material to absorb the synthetic resin; then, the base material absorbing the synthetic resin is dried and hardened; subsequently, the wire is fixedly adhered on the surface of the base material; next, the base material as well as the wire are subjected to hot pressing by the thermoforming device to form a wire damper; finally, the wire damper is cut from the base material by a cutting device. By using the main body of the wire damper to support the wire, the wire has an increased fatigue resistance and becomes not easy to be broken.

However, since the wire is fixedly adhered on the wire disposing area of the main body of the wire damper, when the wire damper is formed on the base material by thermoforming of a thermoforming device, the wire cannot stretch the warp yarns on two sides of the wire disposing area toward outer sides. As a result, the wire protrudes from the surface of the main body of the wire damper, causing the wire to be easily damaged by the hot pressing of the thermoforming device. The wire damper is unusable due to damage to the wire and must be scrapped, which is quite wasteful. It can be seen that the wire damper manufactured by conventional method has a low yield and a high manufacturing cost.

Furthermore, the wire is harder than the main body of the wire damper, and the elasticity and toughness of the wire are worse than that of the main body of the wire damper, so that under the condition that the wire cannot stretch the warp yarns on two sides of the wire disposing area toward outer sides, the combination of the wire disposing area and the wire is harder than the other areas of the main body of the wire damper, and the elasticity and toughness of the combination of the wire disposing area and the wire are worse than that of other areas of the main body of the wire damper. Therefore, the hardness, elasticity, and toughness of the wire damper are non-uniform, resulting in non-uniform elastic resilience and fatigue resistance of the wire damper, which causes the wire damper to be easy to deform, thereby affecting the output sound quality of the loudspeaker.

In addition, the thermoforming device requires larger pressing force to be able to form the wave crests and troughs of the wave structures on the base material, while the thermoforming device requires less pressing force to be able to form the inner sidewalls and the outer sidewalls on the base material. It can be seen that the pressing force of the thermoforming device is non-uniform, so that the thermoforming device non-uniformly applies force to the wire, which causes the following two problems: first, the wire is easily deformed due to being non-uniformly forced; and second, the deformed wire will cause the overall structure of the wire damper to be unbalanced. The above two problems will affect the output sound quality of the loudspeaker.

Para. [0055] in the US2002/0034315A1 recites "After the cloth 70 containing the conductors 66 is woven, it is impregnated with a thermosetting phenolic resin diluted with a solvent. The cloth 70 is then dried in a warm air oven to flash off the solvent, leaving a dry, tack free surface." Para. [0056] in the US2002/0034315A1 recites "The cloth 70 is then molded in a heated tool to form the concentric convolutions of spider 40, and to cure the thermosetting resin. The spider 40 is then trimmed to create a hole 44 in its center and to remove the excess material from its outside diameter 45." Para. [0057] in the US2002/0034315A1 recites "As illustrated in FIG. 5, to form the interconnection between the voice coil wire 43 and the conductive cords 62 incorporated in the spider 40, the voice coil wire 43 is stripped of insulation and adhesive, using conventional techniques in the area 42 where it lies adjacent the spider 40. A small droplet 41 of conductive adhesive is applied to each voice coil lead 43."

From the above paragraphs in the US2002/0034315A1 and its FIGS. 3a-b, 4a-b and 6a-b, it is clear that the conductive cores and yarns are woven together at the same time to form the cloth. Therefore, in the woven process, the elastic adjustment area of the loudspeaker spider is formed by controlling a distance between the conductive cores and yarns.

Para. [0024] in the US2002/0034315A1 recites "FIGS. 3*a-b* illustrate an enlarged plan view and cross section, respectively, of a spider cloth with two sets of seven parallel conductive strands, woven as an integral part of the warp or weft, according to the present invention." Para. [0025] in the US2002/0034315A1 recites "FIGS. 4*a-b* illustrate an enlarged plan view and a cross section, respectively, of a spider cloth with two sets of seven conductive strands twisted together to form two flexible conductive cords, woven as an integral part of the warp or woof, according to the present invention" Para. [0024] in the US2002/0034315A1 recites "FIGS. 6*a-b* illustrate an enlarged plan view and cross-section, respectively, of a spider cloth with two sets of seven conductive strands twisted together to form two flexible conductive cords, woven as an integral part of the warp or woof, with a portion of the length of each cord left as a "float" on the surface of the cloth, according to the present invention."

From the above paragraphs in the US2002/0034315A1, it never discusses the depths of the wave crests, wave troughs, inner sidewalls and outer sidewalls of the wave structures. In fact, from the figures of the US2002/0034315A1, the conductive cores are woven and fixed with the yarns to form the cloth. As a result, the depths are all the same in the hollow portions of the wave structures disclosed in the US2002/0034315A1, and the depth of the hollow portions at any position on the wave structures are symmetrical. Therefore, the loudspeaker spider has some problems recited in the above para. [0007] of the present application.

Para. [0022] in the US2006/0159300A1 recites "Again referring to FIG. 5, the annular spider 1 is composed of a first surface lining 11, a second surface lining 12, and at least one lead wire 2, where the surface lining can be a sheet of cloth or other fabric material, which is pre-treated with copolymerized elastomer and then dried. The upper and lower negatively shaped mould halves 3, 4 respectively have multiple first and second slots 31, 41 on the mould surfaces. The positions of the first slots 31 and second slots 41 shall be aligned, and the slots are preferably in half-circle shape. When the two mould halves 3, 4 are combined, multiple tunnels are formed to hold the lead wires passing through interspaces between two bonded surface linings 11, 12." Para. [0023] in the US2006/0159300A1 recites "In accordance with the first embodiment, before the spider is press formed, the second or lower surface lining 12 is placed on the lower or second negatively shaped mould surface 4, and then multiple lead wires 2 are placed on the lower surface lining 12 and lined up with the slots 41 on the lower mould half 4, and then the first or upper surface lining 11 is laid over the second lining 12 covering the lead wires 2, and then the two mould halves 3, 4 are combined and heat is applied, so that the two linings 11, 12 are bonded together to form a wavy spider 1 with sandwiched lead wires 2, only having the two ends of the lead wires 2 exposed outside the inner rim and outer rim."

Based on the above features, the spider with leadwires sandwiched in the US2006/0159300A1 can achieve some advantages: "Since each mould half has the positions of slots on the mould surface to match the lead wires, so when the two mould halves are combined, the lead wires between the two surface linings are fitted into complimentary slots. This can prevent the press mould from damaging or causing deformation to the lead wires in the press forming process. Therefore, the lead wires can be more durable and the quality of sound reproduction of the speaker will be improved." recites in the para. [0011].

However, the spider with leadwires sandwiched has some problems recited in the above para. [0006] of the present application.

FIG. 8 in the US2006/0159300A1 clearly shows the shape of the trench on the first surface lining corresponds the shape of the first slot on the upper negatively shaped mold halve, and the shape of the trench on the second surface lining corresponds the shape of the second slot on the lower negatively shaped mold halve. Para. [0022] in the US2006/0159300A1 recites "The positions of the first slots 31 and second slots 41 shall be aligned, and the slots are preferably in half-circle shape." Obviously, the shapes of the trenchs on the first and second surface linings are half-circle shape. As a result, the depths are all the same in the hollow portions of the wave structures disclosed in the US2006/0159300A1, and the depth of the hollow portions at any position on the wave structures are symmetrical. Therefore, the spider with leadwires sandwiched has some problems recited in the above para. [0007] of the present application.

Para. [0031] in the US2016/0037264A1 recites "a depth between the crest and trough of the respective corrugation. For instance, the depth of the corrugation 206 is d1." Para. [0039] in the US2016/0037264A1 recites "As such, the depth d2 of corrugation 306 may be a maximum depth of the corrugation 106 . . . As shown, the depth d2 of the corrugation 306 is greater than the depth d1 of the corrugation 206."

From the above paragraphs in the US2016/0037264A1 and its FIGS. 2 and 3A, d1 and d2 are the depths from the top end of the wave crest of the wave structure to the bottom end of the wave trough but not the depth of the trench which is formed by the wire pressing the wire disposing area inwardly. Also, the US2016/0037264A1 does not provide wires.

SUMMARY OF THE INVENTION

The main objective of the present invention is to provide a method for manufacturing a loudspeaker having a wire damper with locally adjustable elasticity, which ensure that the wires will not be damaged by the hot pressing of the thermoforming device. As a result, the manufactured wire damper has a high yield and a low manufacturing cost.

Another objective of the present invention is to provide a method for manufacturing a loudspeaker having a wire damper with locally adjustable elasticity, wherein the wire damper has uniform hardness, elasticity and toughness, thereby having uniform elastic resilience and fatigue resistance, and being not easy to be deformed and brittle, which improves the output sound quality of the loudspeaker.

Yet another objective of the present invention is to provide a method for manufacturing a loudspeaker having a wire damper with locally adjustable elasticity, wherein the thermoforming device can uniformly apply force to the wires, such that the wires can maintain their original shape and will not be deformed, thereby improving the output sound quality of the loudspeaker.

Still another objective of the present invention is to provide a method for manufacturing a loudspeaker having a wire damper with locally adjustable elasticity, which ensure that the wire damper has a more balanced overall structure, thereby being not easy to be deformed and brittle, which improves the output sound quality of the loudspeaker.

In order to achieve the above objectives, the present invention provides a method for manufacturing a loudspeaker having a wire damper with locally adjustable elasticity, including: a preparation step, an impregnating step, a drying step, a wire disposing step, a forming step, a cutting step, and an assembling step.

In the preparation step, a base material, which is a single-layer fabric structure and is formed by interweaving a plurality of warp yarns and a plurality of weft yarns, is prepared.

In the impregnating step, the base material is impregnated in a resin solution.

In the drying step, the base material is dried to form a solid resin layer on the base material.

In the wire disposing step, at least one wire is disposed on the base material.

In the forming step, a wire damper is formed on the base material by thermoforming, in which the wire damper includes a main body and the at least one wire, the main body is a single-layer piece structure formed by interweaving the warp yarns and the weft yarns, the solid resin layer is formed on a surface of the main body, the main body includes a plurality of wave structures, a center hole and at least one wire disposing area, the wave structures are sequentially arranged from an outer edge of the main body to the center hole, each wave structure includes a wave crest, a wave trough, an inner sidewall and an outer sidewall, and the at least one wire disposing area extends radially from the outer edge of the main body through the wave structures to the center hole; wherein the at least one wire disposing area is recessed inwardly to form at least one hollow portion, the at least one wire extends in the at least one hollow portion, and two ends of the at least one wire respectively penetrate an inner edge and the outer edge of the main body; wherein a first elastic adjustment area is formed between the warp yarn closest to outside of a first side of the at least one wire disposing area and the warp yarn at inside of the at least one wire disposing area, a second elastic adjustment area is formed between the warp yarn closest to outside of a second side of the at least one wire disposing area and the warp yarn at the inside of the at least one wire disposing area, widths of the first elastic adjustment area and the second elastic adjustment area are equal to each other, and distances between the remaining warp yarns are less than the width of each of the first elastic adjustment area and the second elastic adjustment area; and wherein each of depths of the at least one hollow portion at the inner sidewalls and the outer sidewalls is less than a depth of the at least one hollow portion at the wave crests, and each of the depths of the at least one hollow portion at the inner sidewalls and the outer sidewalls is less than a depth of the at least one hollow portion at the wave troughs.

In the cutting step, the wire damper is cut from the base material.

In the assembling step, a voice coil is movably disposed in a loudspeaker body, the center hole of the wire damper is sleeved at the voice coil, and the at least one wire of the wire damper is connected to the voice coil, so as to assemble a loudspeaker.

In order to achieve the above objectives, the present invention provides a method for manufacturing a loudspeaker having a wire damper with locally adjustable elasticity, including: a preparation step, an impregnating step, a drying step, a wire disposing step, a forming step, a cutting step, and an assembling step.

In the preparation step, a base material, which is a double-layer fabric structure and includes a first fabric and a second fabric, is prepared. The first fabric is formed by interweaving a plurality of first warp yarns and a plurality of first weft yarns, the second fabric is formed by interweaving a plurality of second warp yarns and a plurality of second weft yarns.

In the impregnating step, the first fabric and the second fabric are impregnated in a resin solution, respectively.

In the drying step, the first fabric and the second fabric are dried to form a first solid resin layer on the first fabric, and to form a second solid resin layer on the second fabric.

In the wire disposing step, at least one wire is first disposed on the first fabric, and the second fabric is then disposed on the first fabric, so as to form the base material.

In the forming step, a wire damper is formed on the base material by thermoforming, in which the wire damper includes a main body and the at least one wire, the main body is a double-layer piece structure and includes a first piece and a second piece, the first piece is formed by interweaving a plurality of first warp yarns and a plurality of first weft yarns, a first solid resin layer is formed on a surface of the first piece, the first piece includes a plurality of first wave structures, a first center hole and at least one first wire disposing area, the first wave structures are sequentially arranged from an outer edge of the first piece to the first center hole, each first wave structure includes a first wave crest, a first wave trough, a first inner sidewall and a first outer sidewall, the at least one first wire disposing area extends radially from the outer edge of the first piece through the first wave structures to the first center hole, the second piece is formed by interweaving a plurality of second warp yarns and a plurality of second weft yarns, a second solid resin layer is formed on a surface of the second piece, the second piece includes a plurality of second wave structures, a second center hole and at least one second wire disposing area, the second wave structures are sequentially arranged from an outer edge of the second piece to the second center hole, each second wave structure includes a second wave crest, a second wave trough, a second inner sidewall and a second outer sidewall, the at least one second wire disposing area extends radially from the outer edge of the second piece through the second wave structures to the second center hole; wherein the first piece is combined with the second piece, and the at least one first wire disposing area corresponds to the at least one second wire disposing area; wherein the at least one first wire disposing area is recessed inwardly to form at least one first trench, the at least one second wire disposing area is recessed inwardly to form at least one second trench, the at least one first trench and the at least one second trench together form at least one hollow portion, the at least one wire extends in the at least one hollow portion, and two ends of the at least one wire respectively penetrate inner edges and the outer edges of the first piece and the second piece; wherein a first lower elastic adjustment area is formed between the first warp yarn closest to outside of a first side of the at least one first wire disposing area and the first warp yarn at inside of the at least one first wire disposing area, a second lower elastic adjustment area is formed between the first warp yarn closest to outside of a second side of the at least one first wire disposing area and the first warp yarn at the inside of the at least one first wire disposing area, widths of the first lower elastic adjustment area and the second lower elastic adjustment area are equal to each other, and distances between the remaining first warp yarns are less than the width of each of the first lower elastic adjustment area and the second lower elastic adjustment area; wherein a first upper elastic adjustment area is formed between the second warp yarn closest to outside of a first side of the at least one second wire disposing area and the second warp yarn at inside of the at least one second wire disposing area, a second upper elastic adjustment area is formed between the second warp yarn closest to outside of a second side of the at least one second wire disposing area and the second warp yarn at the inside of the at least one second wire disposing area, widths of the first upper elastic adjustment area and the second upper elastic adjustment area are equal to each other, and distances between the remaining second warp yarns are less than the width of each of the first upper elastic adjustment area and the second upper elastic adjustment area; and wherein a depth of the at least one first trench at the first wave crests is less than a depth of the at least one second trench at the second wave crests, a depth of the at least one first trench at the first wave troughs is greater than a depth of the at least one second trench at the second wave troughs, a depth of the at least one first trench at the first inner sidewalls is equal to a depth of the at least one second trench at the second inner sidewalls, a depth of the at least one first trench at the first outer sidewalls is equal to a depth of the at least one second trench at the second outer sidewalls.

In the cutting step, the wire damper is cut from the base material.

In the assembling step, a voice coil is movably disposed in a loudspeaker body, the first center hole and the second center hole of the wire damper are sleeved at the voice coil, and the at least one wire of the wire damper is connected to the voice coil, so as to assemble a loudspeaker.

In order to achieve the above objectives, the present invention provides a loudspeaker having a wire damper with locally adjustable elasticity, including a loudspeaker body, a voice coil and a wire damper. The voice coil is movably disposed in the loudspeaker body. The wire damper includes a main body and the at least one wire. The main body is a single-layer piece structure formed by interweaving a plurality of warp yarns and a plurality of weft yarns, a solid resin layer is formed on a surface of the main body, the main body includes a plurality of wave structures, a center hole and at least one wire disposing area, the wave structures are sequentially arranged from an outer edge of the main body to the center hole, each wave structure includes a wave crest, a wave trough, an inner sidewall and an outer sidewall, the center hole is sleeved at the voice coil, the at least one wire disposing area extends radially from the outer edge of the main body through the wave structures to the center hole; wherein the at least one wire disposing area is recessed inwardly to form at least one hollow portion; wherein a first elastic adjustment area is formed between the warp yarn closest to outside of a first side of the at least one wire disposing area and the warp yarn at inside of the at least one wire disposing area, a second elastic adjustment area is formed between the warp yarn closest to outside of a second side of the at least one wire disposing area and the warp yarn at the inside of the at least one wire disposing area, widths of the first elastic adjustment area and the second elastic adjustment area are equal to each other, and distances between the remaining warp yarns are less than the width of each of the first elastic adjustment area and the second elastic adjustment area; and wherein each of depths of the at least one hollow portion at the inner sidewalls and the outer sidewalls is less than a depth of the at least one hollow portion at the wave crests, and each of the depths of the at least one hollow portion at the inner sidewalls and the outer sidewalls is less than a depth of the at least one hollow portion at the wave troughs. The at least one wire extends in the at least one hollow portion, two ends of the at least one wire respectively penetrate an inner edge and the outer edge of the main body, and one end of the at least one wire is connected to the voice coil.

In order to achieve the above objectives, the present invention provides a loudspeaker having a wire damper with locally adjustable elasticity, including a loudspeaker body, a voice coil and a wire damper. The voice coil is movably disposed in the loudspeaker body. The wire damper includes a main body and the at least one wire. The main body is a double-layer piece structure and includes a first piece and a second piece, the first piece is formed by interweaving a plurality of first warp yarns and a plurality of first weft yarns, a first solid resin layer is formed on a surface of the first piece, the first piece includes a plurality of first wave structures, a first center hole and at least one first wire disposing area, the first wave structures are sequentially arranged from an outer edge of the first piece to the first center hole, each first wave structure includes a first wave crest, a first wave trough, a first inner sidewall and a first outer sidewall, the at least one first wire disposing area extends radially from the outer edge of the first piece through the first wave structures to the first center hole, the second piece is formed by interweaving a plurality of second warp yarns and a plurality of second weft yarns, a second solid resin layer is formed on a surface of the second piece, the second piece includes a plurality of second wave structures, a second center hole and at least one second wire disposing area, the second wave structures are sequentially arranged from an outer edge of the second piece to the second center hole, each second wave structure includes a second wave crest, a second wave trough, a second inner sidewall and a second outer sidewall, the at least one second wire disposing area extends radially from the outer edge of the second piece through the second wave structures to the second center hole; wherein the first piece is combined with the second piece, and the at least one first wire disposing area corresponds to the at least one second wire disposing area, the first center hole and the second center hole are sleeved at the voice coil; wherein the at least one first wire disposing area is recessed inwardly to form at least one first trench, the at least one second wire disposing area is recessed inwardly to form at least one second trench, the at least one first trench and the at least one second trench together form at least one hollow portion; wherein a first lower elastic adjustment area is formed between the first warp yarn closest to outside of a first side of the at least one first wire disposing area and the first warp yarn at inside of the at least one first wire disposing area, a second lower elastic adjustment area is formed between the first warp yarn closest to outside of a second side of the at least one first wire disposing area and the first warp yarn at the inside of the at least one first wire disposing area, widths of the first lower elastic adjustment area and the second lower elastic adjustment area are equal to each other, and distances between the remaining first warp yarns are less than the width of each of the first lower elastic adjustment area and the second lower elastic adjustment area; wherein a first upper elastic adjustment area is formed between the second warp yarn closest to outside of a first side of the at least one second wire disposing area and the second warp yarn at inside of the at least one second wire disposing area, a second upper elastic adjustment area is formed between the second warp yarn closest to outside of a second side of the at least one second wire disposing area and the second warp yarn at the inside of the at least one second wire disposing area, widths of the first upper elastic adjustment area and the second upper elastic adjustment area are equal to each other, and distances between the remaining second warp yarns are less than the width of each of the first upper elastic adjustment area and the second upper elastic adjustment area; and wherein a depth of the at least one first trench at the first wave crests is less than a depth of the at least one second trench at the second wave crests, a depth of the at least one first trench at the first wave troughs is greater than a depth of the at least one second trench at the second wave troughs, a depth of the at least one first trench at the first inner sidewalls is equal to a depth of the at least one second trench at the second inner sidewalls, a depth of the at least one first trench at the first outer sidewalls is equal to a depth of the at least one second trench at the second outer sidewalls. the at least one wire extends in the at least one hollow portion, and two ends of the at least one wire respectively penetrate inner edges and the outer edges of the first piece and the second piece, and one end of the at least one wire is connected to the voice coil.

The present invention has the advantageous in that the wire disposing areas can be pressed by the wires, thereby recessing inwardly to form the hollow portions. It ensures that the wires will not be damaged by the hot pressing of the thermoforming device. As a result, the manufactured wire damper has a high yield and a low manufacturing cost.

Furthermore, the hardness, elasticity and toughness of the wire disposing areas can be adjusted by the elastic adjustment areas. Therefore, the wire disposing areas become softer, and their elasticity and toughness are increased. Thereby, the hardness, elasticity, and toughness of the combination of the wire disposing areas and the wires are equivalent to that of other areas of the main body. Therefore, the wire damper has uniform hardness, elasticity and toughness, thereby having uniform elastic resilience and fatigue resistance, and being not easy to be deformed and brittle, which improves the output sound quality of the loudspeaker.

Further, since the hollow portions with non-uniform depth allow the wires to extend therein in an non-uniform arrangement manner, the thermoforming device can uniformly apply force to the wires, such that the wires can maintain their original shape and will not be deformed, thereby improving the output sound quality of the loudspeaker.

In addition, the present invention can ensure that the wire damper has a more balanced overall structure, thereby being not easy to be deformed and brittle, which improves the output sound quality of the loudspeaker.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
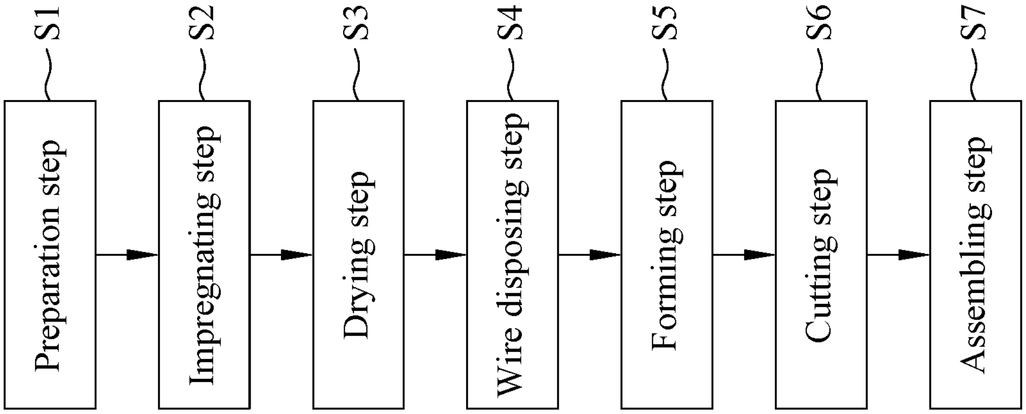
FIG. 1 is a block flow diagram of the manufacturing method of the present invention.

Embodiments of the present invention will be described in more detail below with reference to the drawings and the reference numerals, such that those skilled in the art can implement it after studying this specification.

Referring to FIGS. 1 to 10, the present invention provides a method for manufacturing a loudspeaker having a wire damper with locally adjustable elasticity, including: a preparation step S1, an impregnating step S2, a drying step S3, a wire disposing step S4, a forming step S5, a cutting step S6, and an assembling step S7.

Figure 2:
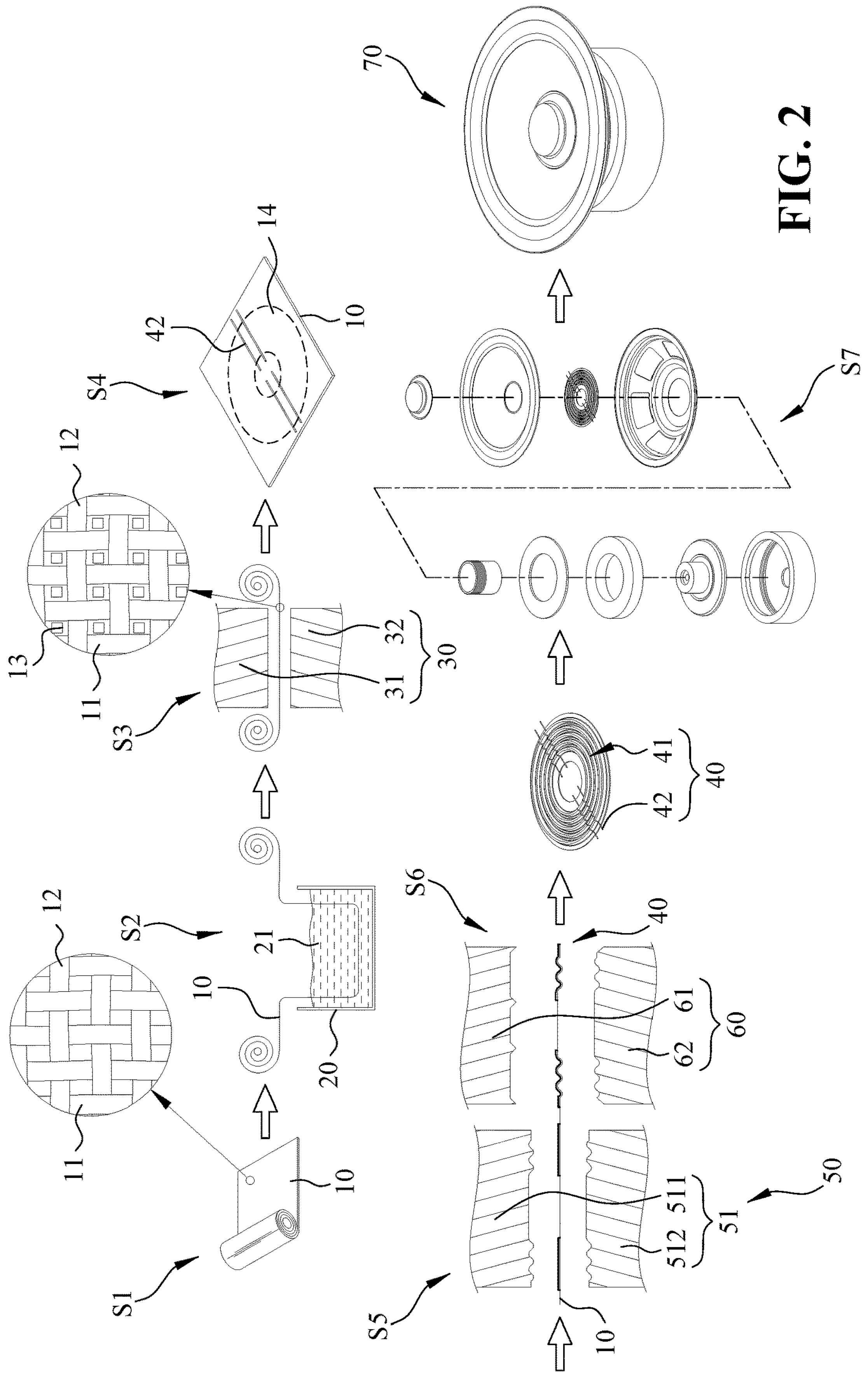
FIG. 2 is a schematic flow diagram of the first embodiment of the manufacturing method of the present invention.
Figure 3:
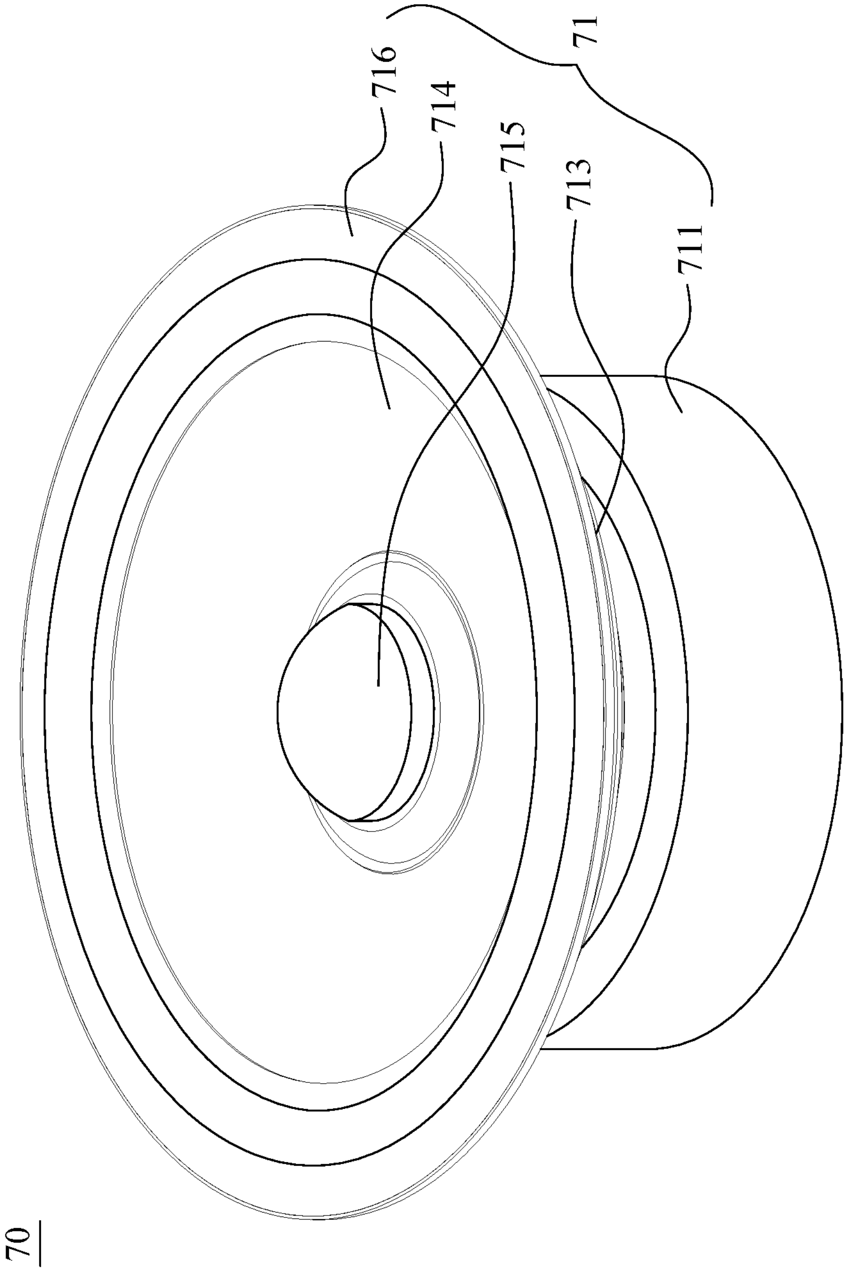
FIG. 3 is a perspective view of the first embodiment of the loudspeaker of the present invention.
Figure 4:
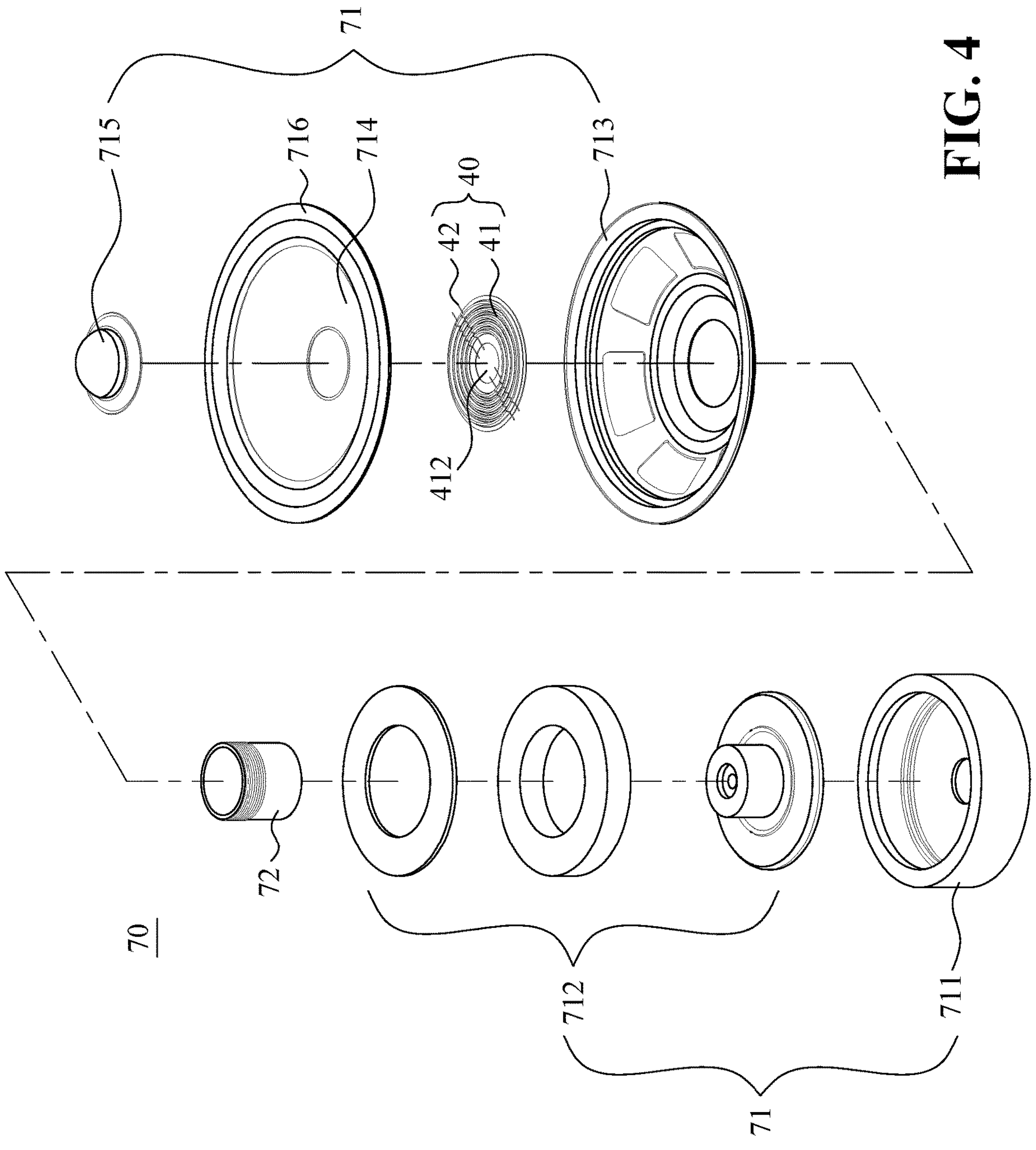
FIG. 4 is an exploded view of the first embodiment of the loudspeaker of the present invention.
Figure 5:
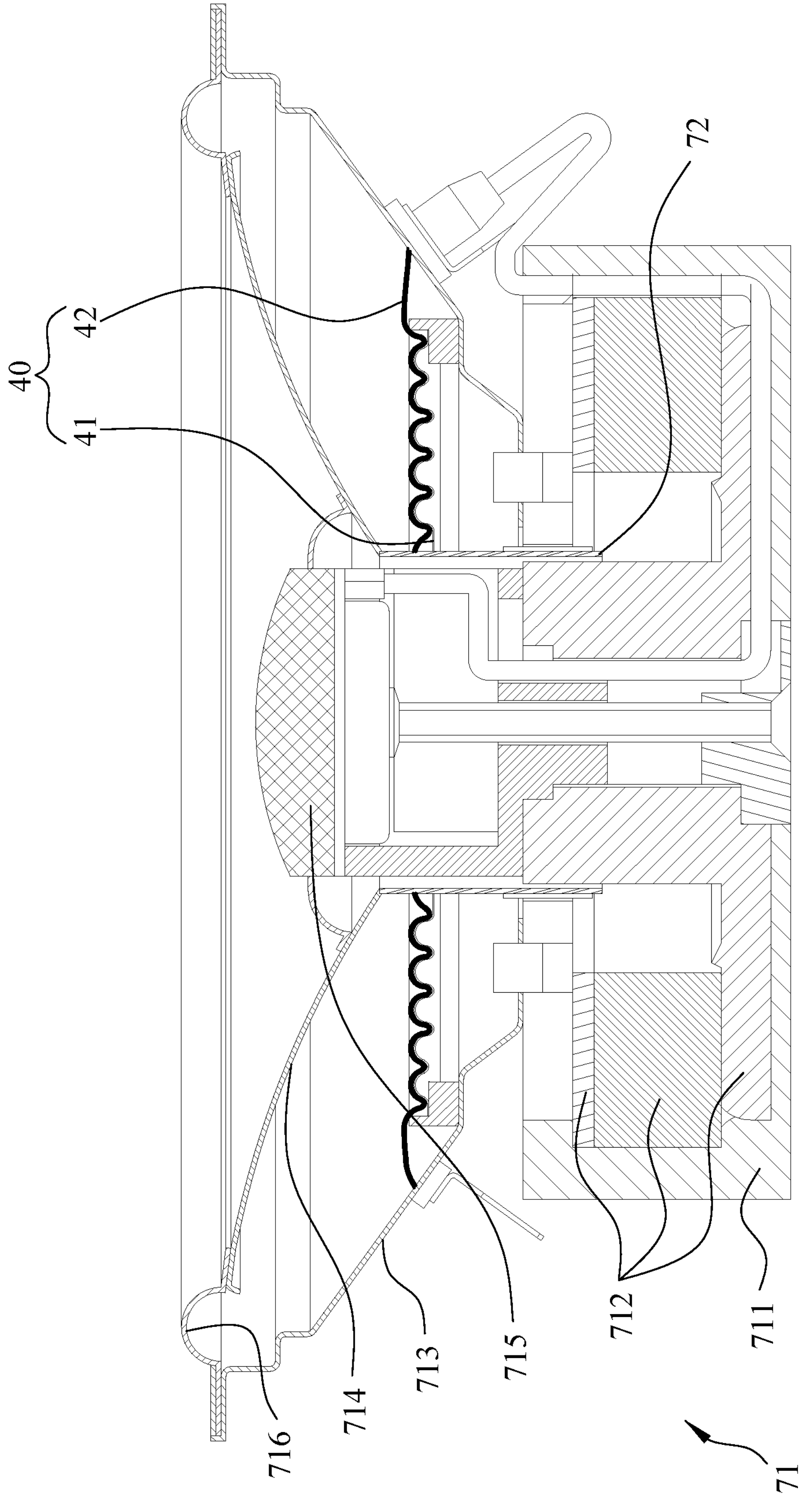
FIG. 5 is a cross-sectional view of the first embodiment of the loudspeaker of the present invention.
Figure 6:
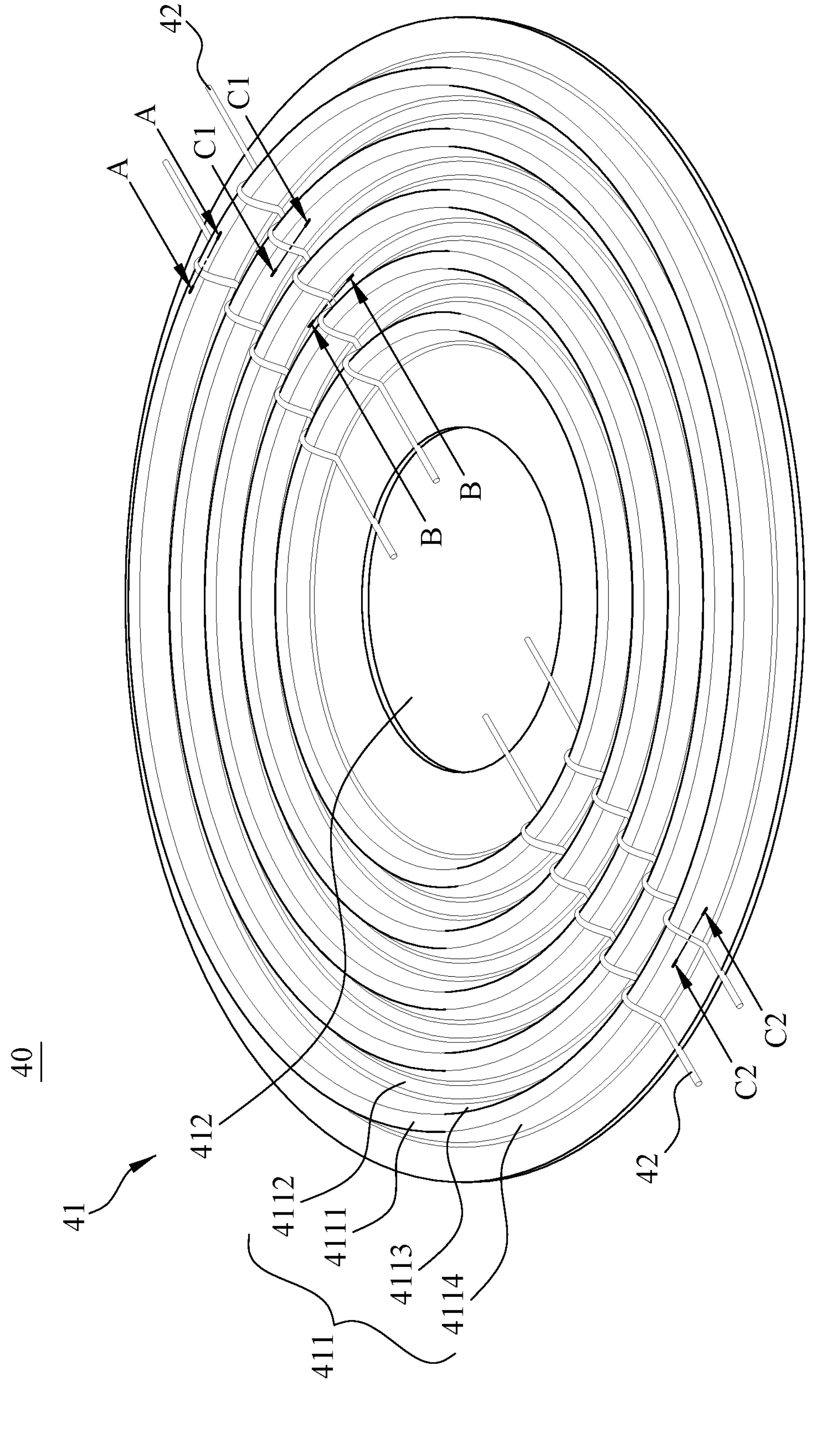
FIG. 6 is a perspective view of the wire damper of the first embodiment of the present invention.
Figure 7:
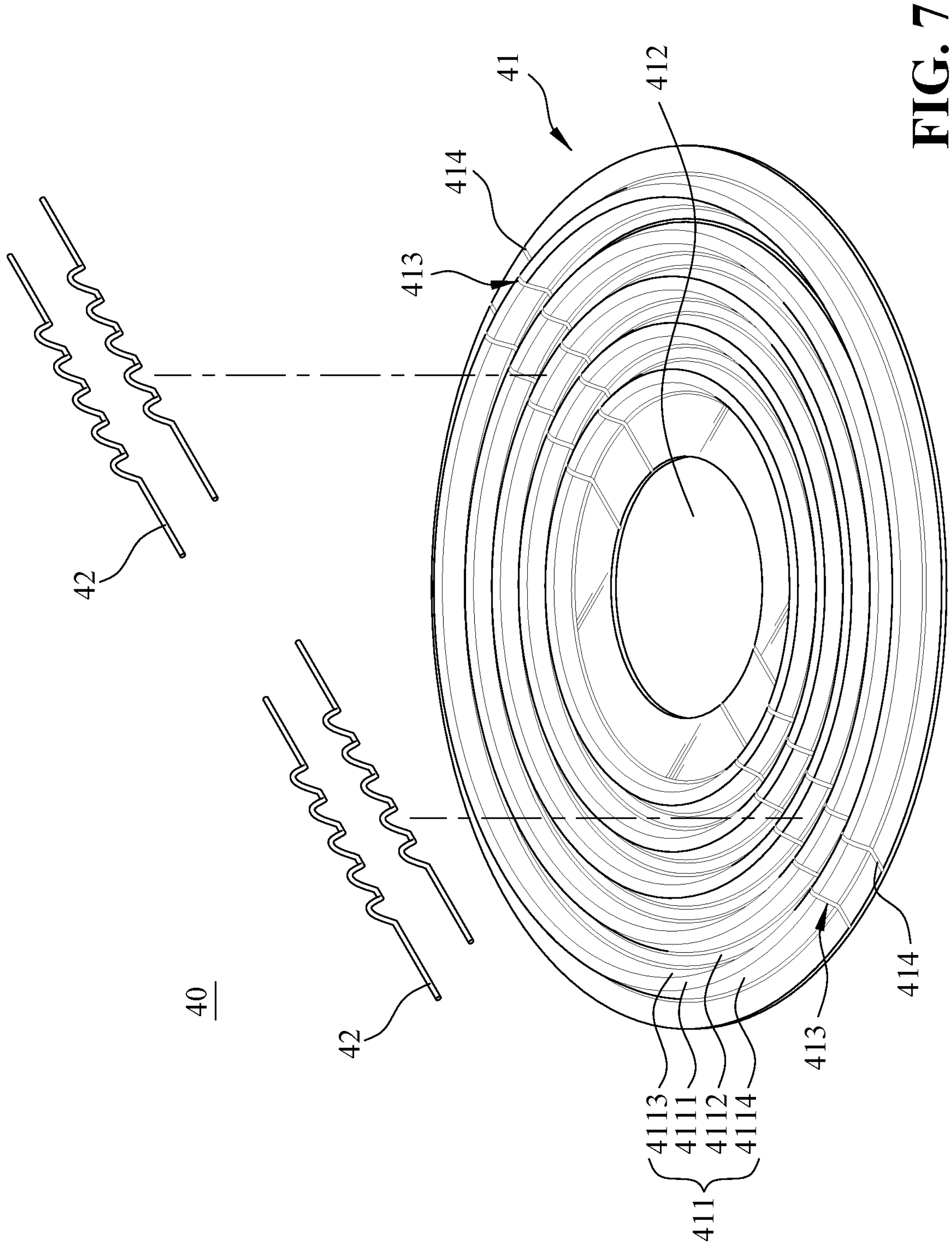
FIG. 7 is an exploded view of the wire damper of the first embodiment of the present invention.

In the preparation step S1, as shown in FIG. 2, a base material 10, which is a single-layer fabric structure and is formed by interweaving a plurality of warp yarns 11 and a plurality of weft yarns 12, is prepared.

In the impregnating step S2, as shown in FIG. 2, the base material 10 is impregnated in a resin solution 21 in a resin tank 20, such that the warp yarns 11 and the weft yarns 12 adsorb the resin and are adhered with the resin.

In the drying step S3, as shown in FIG. 2, a drying device 30 includes an upper baking plate 31 and a lower baking plate 32. By utilizing the temperature of the upper baking plate 31 and the lower baking plate 32, the moisture and volatile substances in the resin on the base material 10 are removed such that the base material 10 is dried. Meanwhile, the resin penetrates into the base material 10 and is adhered onto the warp yarns 11 and the weft yarns 12, so as to form a solid resin layer 13.

In the wire disposing step S4, as shown in FIG. 2, at least one wire 42 is disposed on at least one wire disposing area 413 of the base material 10. In the first embodiment, four wire disposing area 413 of each of damper forming areas 14 on the base material 10 is provided with four wires 42. However, the number of the wires 42, provided in each damper forming area 14 on the base material 10, are not limited to this. Preferably, as shown in FIGS. 6 to 9, the cross section of each wire 42 is circular. In other embodiments, the cross section of each wire 42 may also be a flat section.

Figure 8:
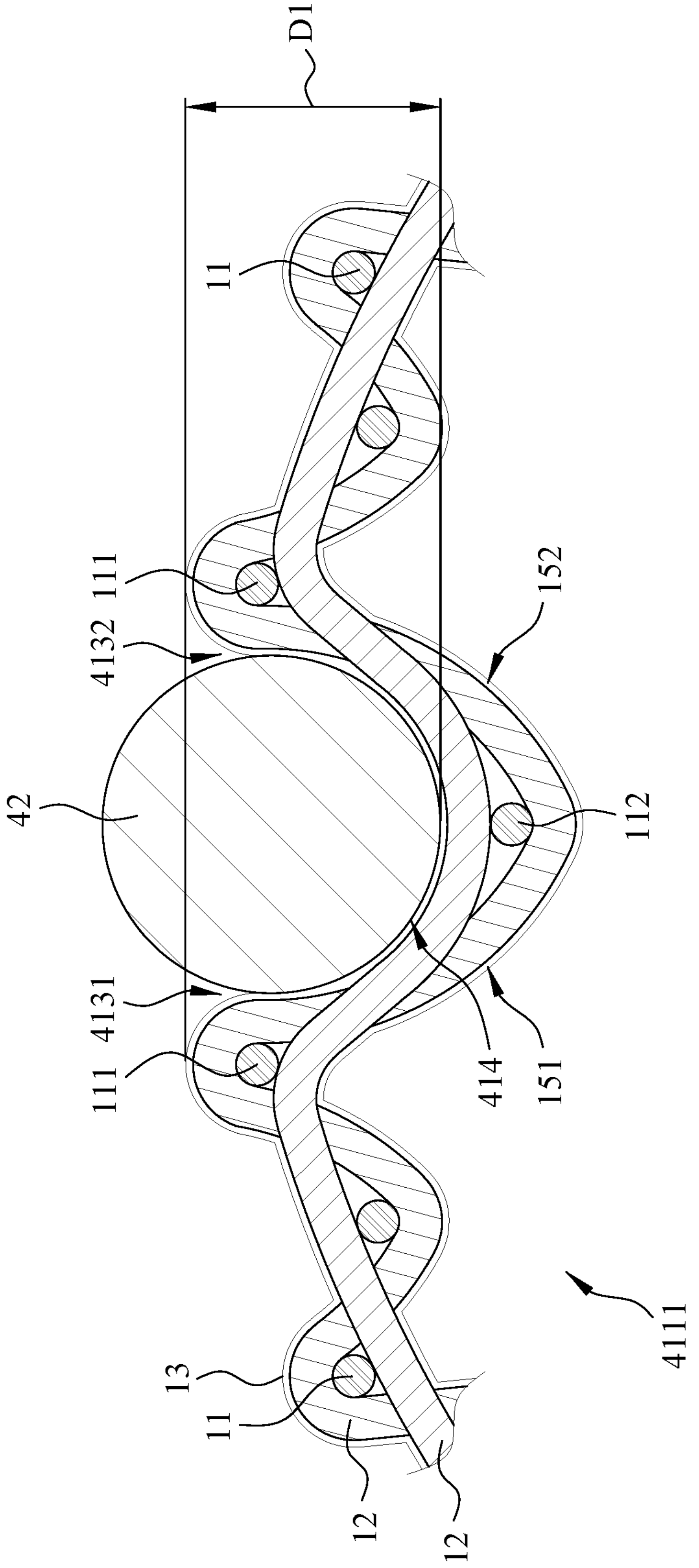
FIG. 8 is a cross-sectional view along line A-A of FIG. 6.
Figure 9:
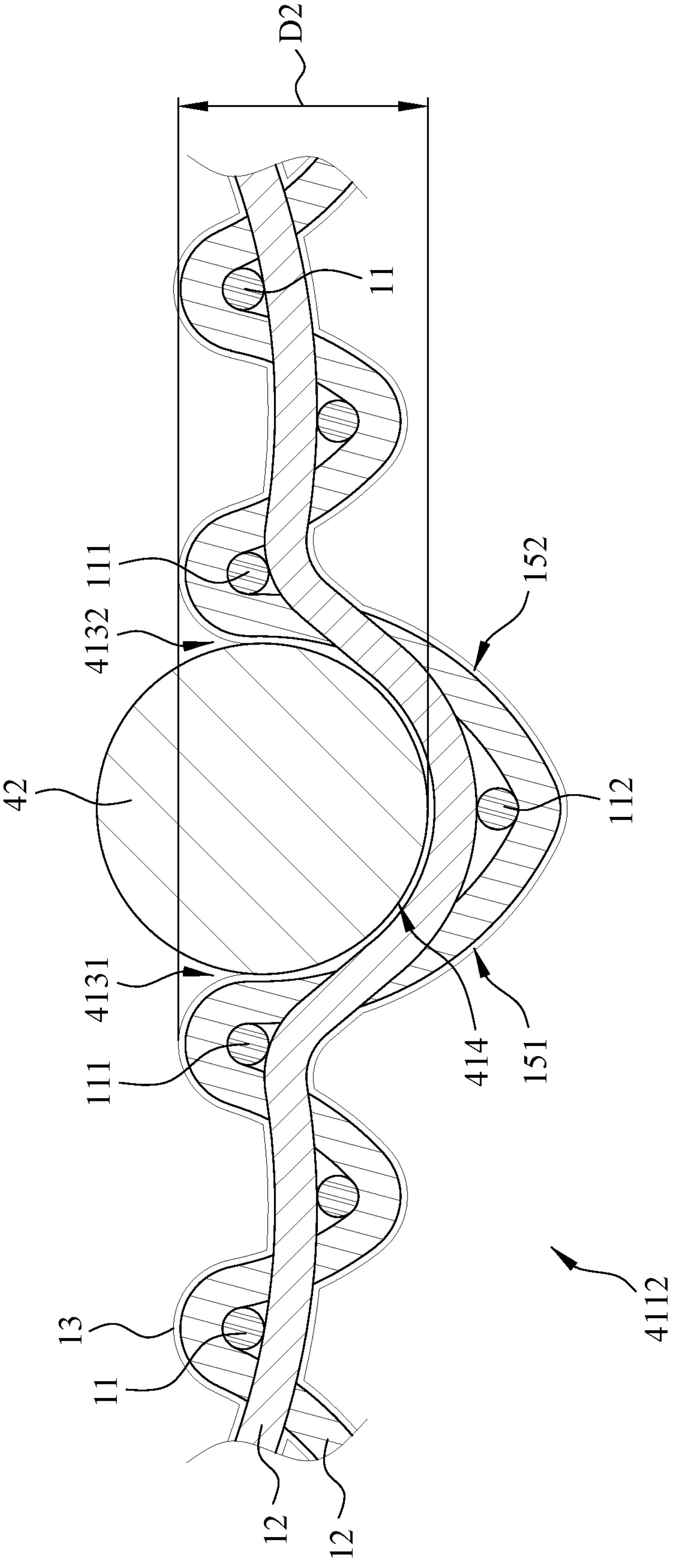
FIG. 9 is a cross-sectional view along line B-B of FIG. 6.
Figure 10:
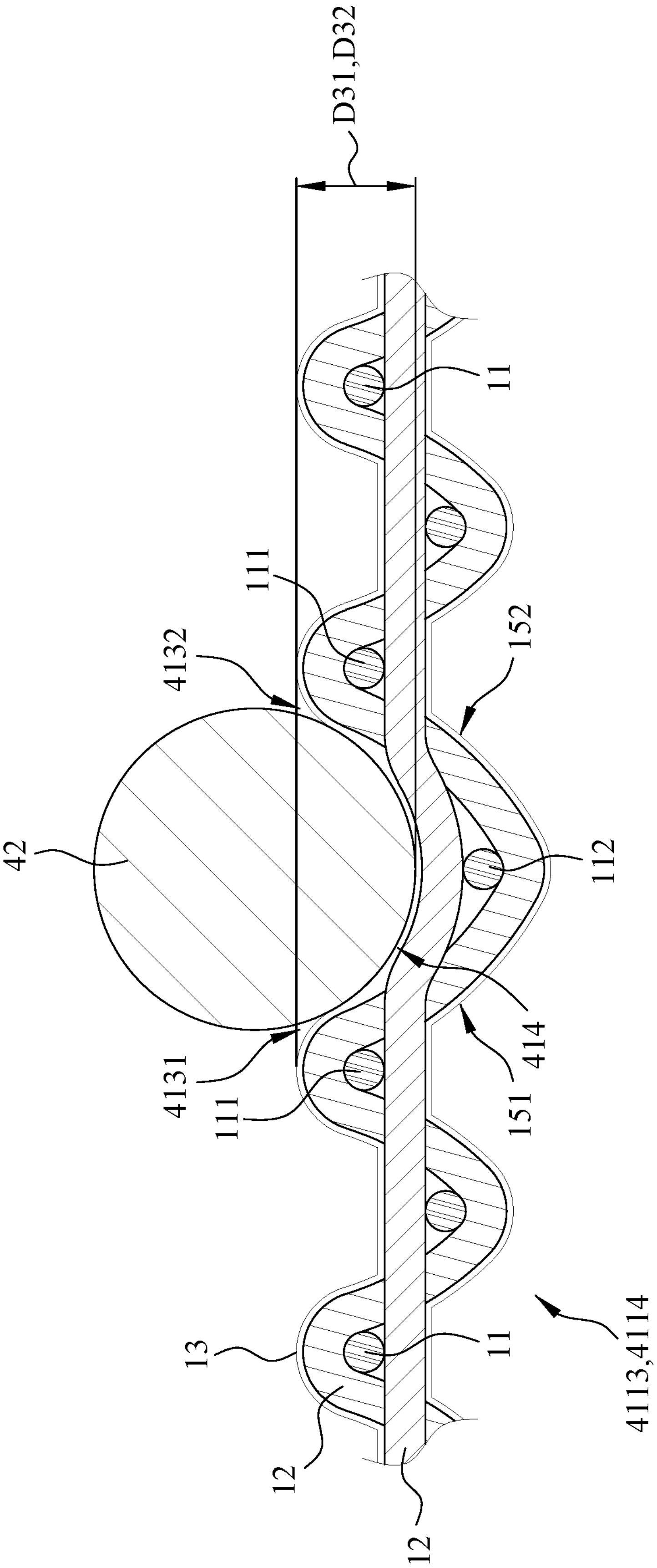
FIG. 10 is a cross-sectional view along line C1-C1 and line C2-C2 of FIG. 6.

In the forming step S5, as shown in FIG. 2, a thermoforming device 50 comprises a forming mold 51 and a heating device (not shown), and the forming mold 51 includes an upper mold 511 and a lower mold 512. The upper mold 511 has a plurality of protrusions and a plurality of recesses and a central flat portion, and the lower mold 512 has a plurality of protrusions and a plurality of recesses and a central flat portion. When the upper mold 511 and the lower mold 512 fit together, the recesses of the upper mold 511 and the protrusions of the lower mold 512 press the base material 10 to form a plurality of wave crests 4111 while the recesses of the upper mold 511 and the protrusions of the lower mold 512 press the at least one wire 42, the protrusions of the upper mold 511 and the recesses of the lower mold 512 press the base material 10 to form a plurality of wave troughs 4112 while the protrusions of the upper mold 511 and the recesses of the lower mold 512 press the at least one wire 42, outer sides of the protrusions of the upper mold 511 and inner sides of the protrusions of the lower mold 512 press the base material 10 to form a plurality of inner sidewalls 4113 while the outer sides of the protrusions of the upper mold 511 and the inner sides of the protrusions of the lower mold 512 press the at least one wire 42, inner sides of the protrusions of the upper mold 511 and outer sides of the protrusions of the lower mold 512 press the base material 10 to form a plurality of outer sidewalls 4114 while the inner sides of the protrusions of the upper mold 511 and the outer sides of the protrusions of the lower mold 512 press the at least one wire 42, and the central flat portion of the upper mold 511 and the central flat portion of the lower mold 512 press the base material 10 to form a center hole pre-formed area. Each wave crest 4111, each wave trough 4112, each inner sidewall 4113 and each outer sidewall 4114 are formed with a wave structure. Under the pressure of the upper mold 511 and the lower mold 512, the at least one wire 42 further presses the at least one wire disposing area 413 of the base material 10 to be recessed inwardly to form at least one hollow portion 414, and the at least one wire 42 stretches the warp yarns 111 on two sides of the at least one wire disposing area 413 toward outer sides, so that the at least one wire 42 enters into the at least one hollow portion 414 immediately. Therefore, the wave structures 411, the center hole pre-formed area and the at least one wire disposing area 413 are formed with a main body 41, the at least one wire 42 extends in the at least one hollow portion 414, and two ends of the at least one wire 42 respectively penetrate the inner and outer edges of the main body 41, so that the main body 41 and the at least one wire 42 are formed with a wire damper 40. The wave structures 411 are sequentially arranged from the outer edge of the main body 41 to the center hole pre-formed area. The at least one wire disposing area 413 extends radially from the outer edge of the main body 41 through the wave structures 411 to the center hole pre-formed area. As shown in FIGS. 8 to 10, after the at least one wire 42 stretches the warp yarns 111 on two sides of the at least one wire disposing area 413 toward outer sides, a first elastic adjustment area 151 is formed between a warp yarn 111 closest to outside of a first side 4131 of the at least one wire disposing area 413 and a warp yarn 112 at inside of the at least one wire disposing area 413, a second elastic adjustment area 152 is formed between a warp yarn 111 closest to outside of a second side 4132 of the at least one wire disposing area 413 and the warp yarn 112 at inside of the at least one wire disposing area 413, and the widths of the first elastic adjustment area 151 and the second elastic adjustment area 152 are equal to each other, and the distances between the remaining warp yarns 11 are less than the width of each of the first elastic adjustment area 151 and the second elastic adjustment area 152. As shown in FIGS. 8 to 10, after the at least one wire 42 stretches the warp yarns 111 on two sides of the at least one wire disposing area 413 toward outer sides, the depth D31 of the at least one hollow portion 414 at the inner sidewalls 4113 is less than the depth D1 of the at least one hollow portion 414 at the wave crests 4111, the depth D32 of the at least one hollow portion 414 at the outer sidewalls 4114 is less than the depth D1 of the at least one hollow portion 414 at the wave crests 4111, the depth D31 of the at least one hollow portion 414 at the inner sidewalls 4113 is less than the depth D2 of the at least one hollow portion 414 at the wave troughs 4112, and the depth D32 of the at least one hollow portion 414 at the outer sidewalls 4114 is less than the depth D2 of the at least one hollow portion 414 at the wave troughs 4112. Preferably, as shown in FIGS. 8 and 9, the depth D1 of the at least one hollow portion 414 at the wave crests 4111 is equal to the depth D2 of the at least one hollow portion 414 at the wave troughs 4112; and as shown in FIG. 10, the depth D31 of the at least one hollow portion 414 at the inner sidewalls 4113 is equal to the depth D32 of the at least one hollow portion 414 at the outer sidewalls 4114. In the first embodiment, the wire damper 40 includes four wires 42, and the main body 41 includes four wire disposing areas 413. The wires 42 are respectively disposed at the wire disposing areas 413. The wire disposing areas 413 are recessed inwardly to form four hollow portions 414. The wires 42 extend in the hollow portions 414 respectively. When the upper mold 511 and the lower mold 512 fit together and press the base material 10 and the at least one wire 42, the heating device is applied with electricity to increase the temperature of the upper mold 511 and the lower mold 512, thereby softening the resin on the base material 10. In addition to destroying the resin structure, the resin also fills up in the gaps, and thus respective parts of the resin are connected with each other to form the final morphology of the solid resin layer 13. Therefore, the resin cover between the warp yarns 11 and the weft yarns 12.

In the cutting step S6, as shown in FIG. 2, a cutting device 60 includes an upper cutting tool 61 and a lower cutting tool 62. The wire damper 40 is cut from the base material 10 by the upper cutting tool 61 and the lower cutting tool 62, and the center hole pre-formed area is cut out by the upper cutting tool 61 and the lower cutting tool 62, such that the wire damper 40 is separated from the base material 10, and the wire damper 40 has a center hole 412.

In the assembling step S7, as shown in FIGS. 2 to 5, a loudspeaker body 71 includes a base 711, a magnetic circuit device 712, an outer frame 713, a diaphragm 714, a dust cover 715, and a surround 716. The magnetic circuit device 712 is disposed on the base 711. A voice coil 72 is movably disposed in the magnetic circuit device 712. The outer frame 713 is disposed at upper side of the magnetic circuit device 712 and supports the outer edge of the main body 41 of the wire damper 40. The diaphragm 714 is sleeved at the voice coil 72. The dust cover 715 is disposed on a center hole of the diaphragm 714. The surround 716 is disposed between the top edge of the diaphragm 714 and the outer frame 713. The center hole 412 of the wire damper 40 is sleeved at the voice coil 72, and the wires 42 of the wire damper 40 are connected to the voice coil 72. Thereby, the loudspeaker body 71, the voice coil 72 and the wire damper 40 are assembled together to form a loudspeaker 70.

As shown in FIGS. 3 to 10, the present invention provides a loudspeaker 70 having a wire damper with locally adjustable elasticity, including a loudspeaker body 71, a voice coil 72, and a wire damper 40. The structure of the loudspeaker body 71, the voice coil 72, and the wire damper 40 and their connection relationship are as described above.

According to this, since the wires 42 are not fixedly adhered onto the surface of the yarns of the base material 10 when being disposed on the base material 10, when the wire damper 40 is formed on the base material 10 by thermoforming of the thermoforming device 50, the wire disposing areas 413 can be pressed by the wires 42, thereby recessing inwardly to form the hollow portions 414. It ensures that the wires 42 will not be damaged by the hot pressing of the thermoforming device 50. As a result, the manufactured wire damper 40 has a high yield and a low manufacturing cost.

Furthermore, by the first elastic adjustment areas 151 and the second elastic adjustment areas 152, the hardness, elasticity and toughness of the wire disposing areas 413 can be adjusted. Therefore, the wire disposing areas 413 become softer, and their elasticity and toughness are increased.

Thereby, the hardness, elasticity, and toughness of the combination of the wire disposing areas 413 and the wires 42 are equivalent to that of other areas of the main body 41. Therefore, the wire damper 40 has uniform hardness, elasticity and toughness, thereby having uniform elastic resilience and fatigue resistance, and being not easy to be deformed and brittle, which improves the output sound quality of the loudspeaker.

In addition, the thermoforming device 50 must uniformly apply force to each wire 42 to ensure that each wire 42 will not be deformed due to being non-uniformly forced. However, the thermoforming device 50 requires larger pressing force to be able to form the wave crests 4111 and the wave troughs 4112 by thermoforming; and the thermoforming device 50 requires less pressing force to be able to form the inner sidewalls 4113 and the outer sidewalls 4114 by thermoforming. Therefore, after the at least one wire 42 stretches the warp yarns 111 on two sides of the at least one wire disposing area 413 toward outer sides, the depth D31 of the hollow portions 414 at the inner sidewalls 4113 is less than the depth D1 of the hollow portions 414 at the wave crests 4111, the depth D32 of the hollow portions 414 at the outer sidewalls 4114 is less than the depth D1 of the hollow portions 414 at the wave crests 4111, the depth D31 of the hollow portions 414 at the inner sidewalls 4113 is less than the depth D2 of the hollow portions 414 at the wave troughs 4112, and the depth D32 of the hollow portions 414 at the outer sidewalls 4114 is less than the depth D2 of the hollow portions 414 at the wave troughs 4112. In other words, the depths of the hollow portions 414 are non-uniform. Since the hollow portions 414 with non-uniform depth allow the wires 42 to extend therein in an non-uniform arrangement manner, the thermoforming device 50 can uniformly apply force to each wire 42, such that the wires 42 can maintain their original shape and will not be deformed, thereby improving the output sound quality of the loudspeaker. Under the condition that the wires 42 maintain their original shapes, relative large parts of volumes of the wires 42 are positioned in the hollow portions 414 at the wave crests 4111 and the wave troughs 4112, while relative small parts of volumes of the wires 42 are positioned in the hollow portions 414 at the inner sidewalls 4113 and the outer sidewalls 4114. Also, relative small parts of volume of the wires 42 are exposed on the surface of the main body 41 at the wave crests 4111 and the wave troughs 4112, while relative large parts of volumes of the wires 42 are exposed on the surface of the main body 41 at the inner sidewalls 4113 and the outer sidewalls 4114.

In addition, the depth D1 of the hollow portions 414 at the wave crests 4111 is equal to the depth D2 of the hollow portions 414 at the wave troughs 4112, such that the volumes of the wires 42 positioned in the hollow portions 414 at the wave crests 4111 and the wave troughs 4112 are equal to each other, and the volumes of the wires 42 exposed on the surface of the main body 41 at the wave crests 4111 and the wave troughs 4112 are equal to each other. Furthermore, since the depth D31 of the hollow portions 414 at the inner sidewalls 4113 is equal to the depth D32 of the hollow portions 414 at the outer sidewalls 4114, the volumes of the wires 42 positioned in the hollow portions 414 at the inner sidewalls 4113 and the outer sidewalls 4114 are equal to each other, and the volumes of the wires 42 exposed on the surface of the main body 41 at the inner sidewalls 4113 and the outer sidewalls 4114 are equal to each other. Therefore, the wire damper 40 has a more balanced overall structure with uniform hardness, elasticity and toughness, thereby having uniform elastic resilience and fatigue resistance, and being not easy to be deformed and brittle, which improves the output sound quality of the loudspeaker.

Referring to FIG. 1 and FIGS. 11A to 16, the present invention provides a method for manufacturing a loudspeaker having a wire damper with locally adjustable elasticity, wherein the manufacturing method of the second embodiment is different from that of the first embodiment as following.

Figure 11A:
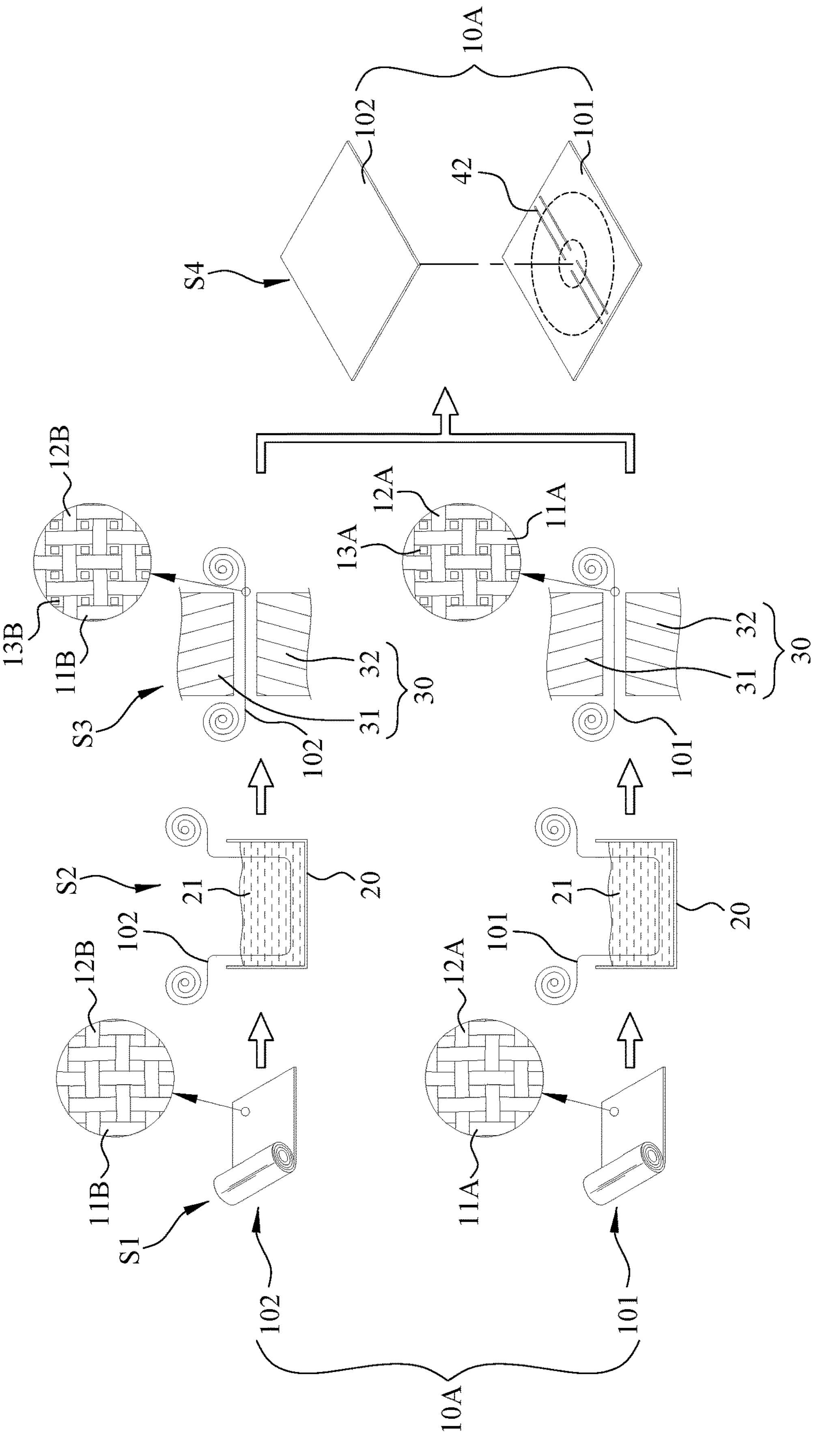
FIGS. 11A and 11B are schematic flow diagrams of the second embodiment of the manufacturing method of the present invention.

In a preparation step S1, as shown in FIG. 11A, a base material 10A is a double-layer fabric structure and includes a first fabric 101 and a second fabric 102. The first fabric 101 is formed by interweaving a plurality of first warp yarns 11A and a plurality of first weft yarns 12A. The second fabric 102 is formed by interweaving a plurality of second warp yarns 11B and a plurality of second weft yarns 12B.

In an impregnating step S2, as shown in FIG. 11A, the first fabric 101 and the second fabric 102 are impregnated in a resin solution 21, respectively.

In a drying step S3, as shown in FIG. 11A, the first fabric 101 and the second fabric 102 are dried, so as to form a first solid resin layer 13A on the first fabric 101, and to form a second solid resin layer 13B on the second fabric 102.

In a wire disposing step S4, as shown in FIG. 11A, at least one wire 42 is first disposed on at least one first wire disposing area 413A of the first fabric 101, the second fabric 102 is then disposed on the first fabric 101, at least one wire 42 is disposed on at least one second wire disposing area 413B of the second fabric 102, and the at least one first wire disposing area 413A corresponds to the at least one second wire disposing area 413B.

Figure 11B:
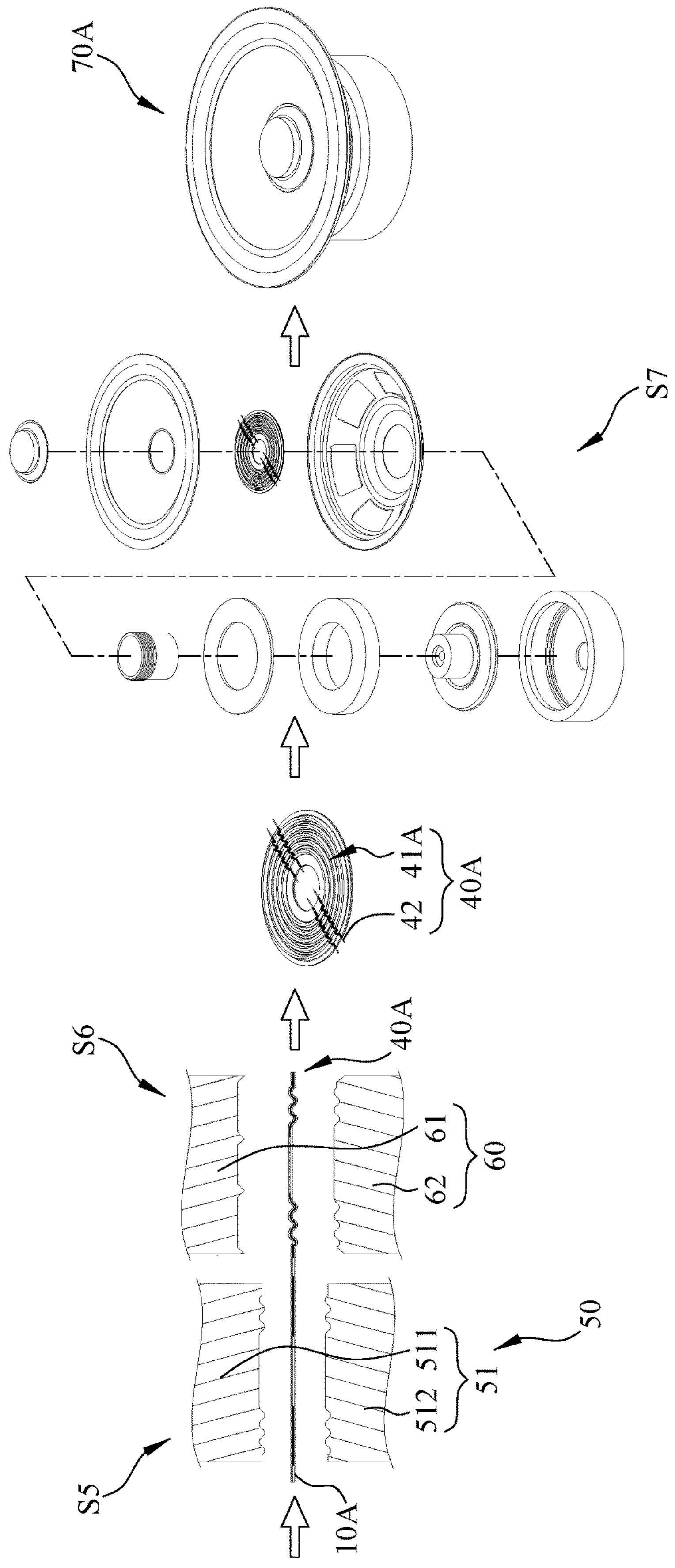
Figure 12:
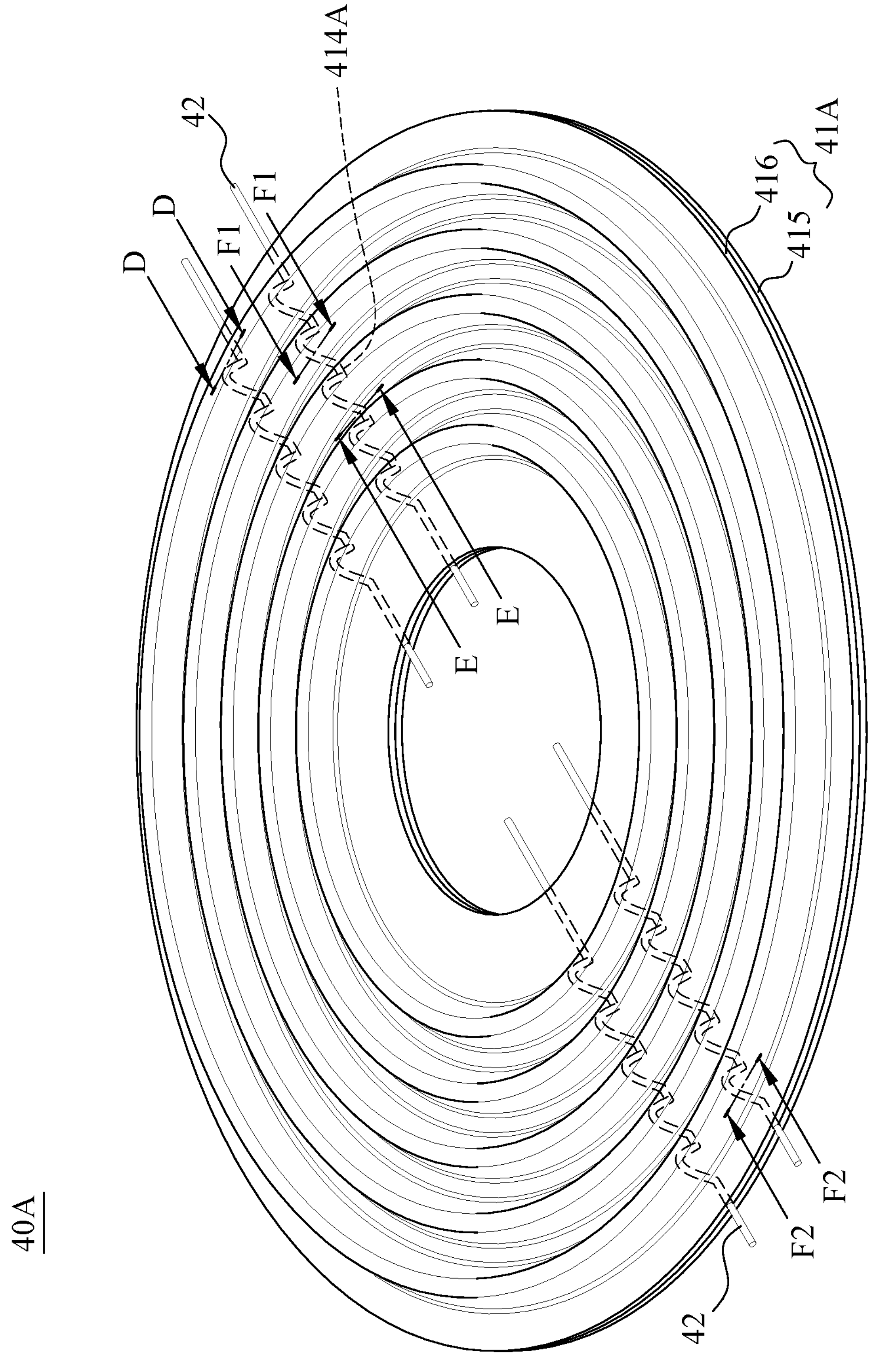
FIG. 12 is a perspective view of a wire damper of the second embodiment of the present invention.
Figure 13:
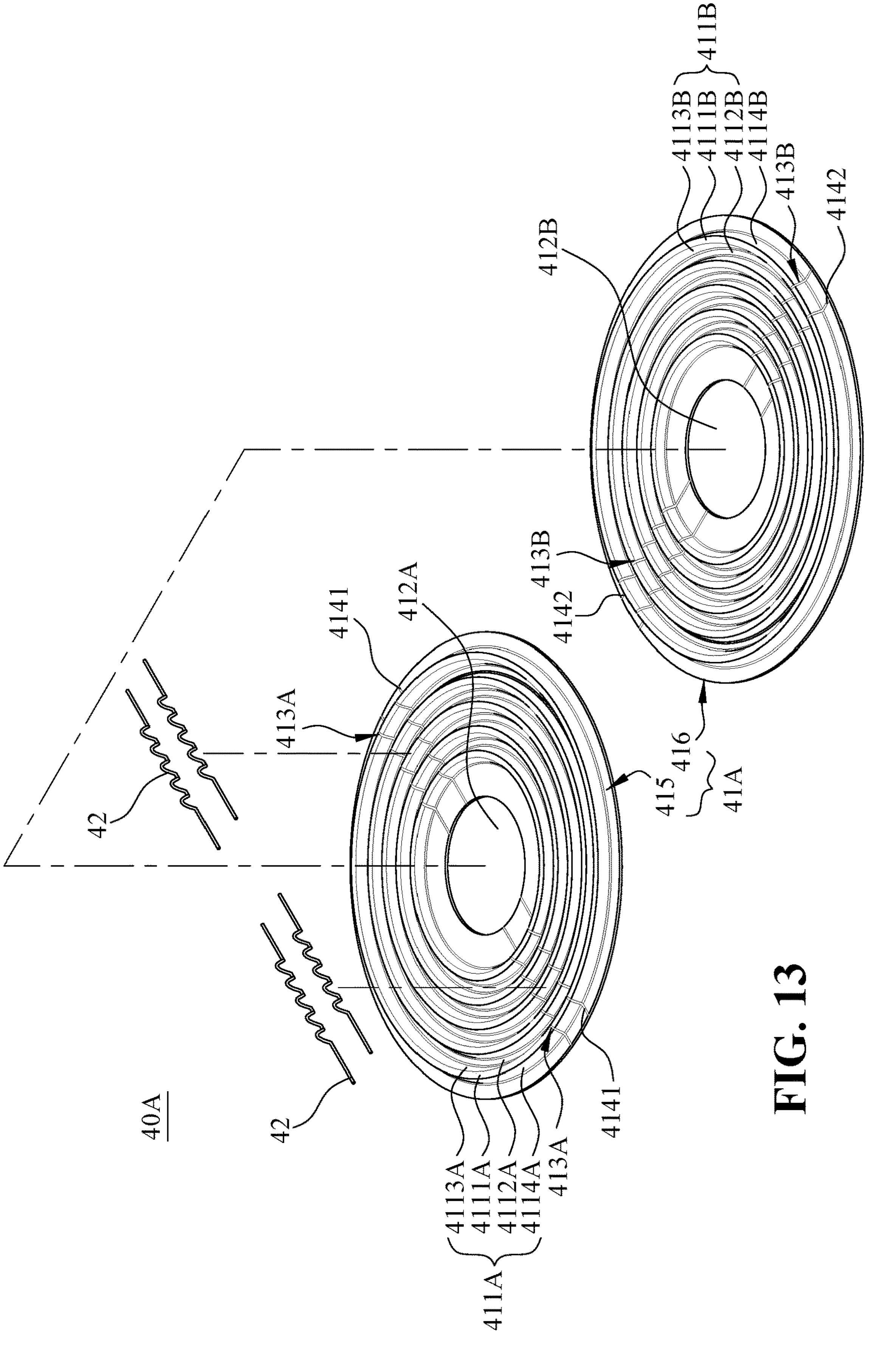
FIG. 13 is an exploded view of the wire damper of the second embodiment of the present invention.
Figure 14:
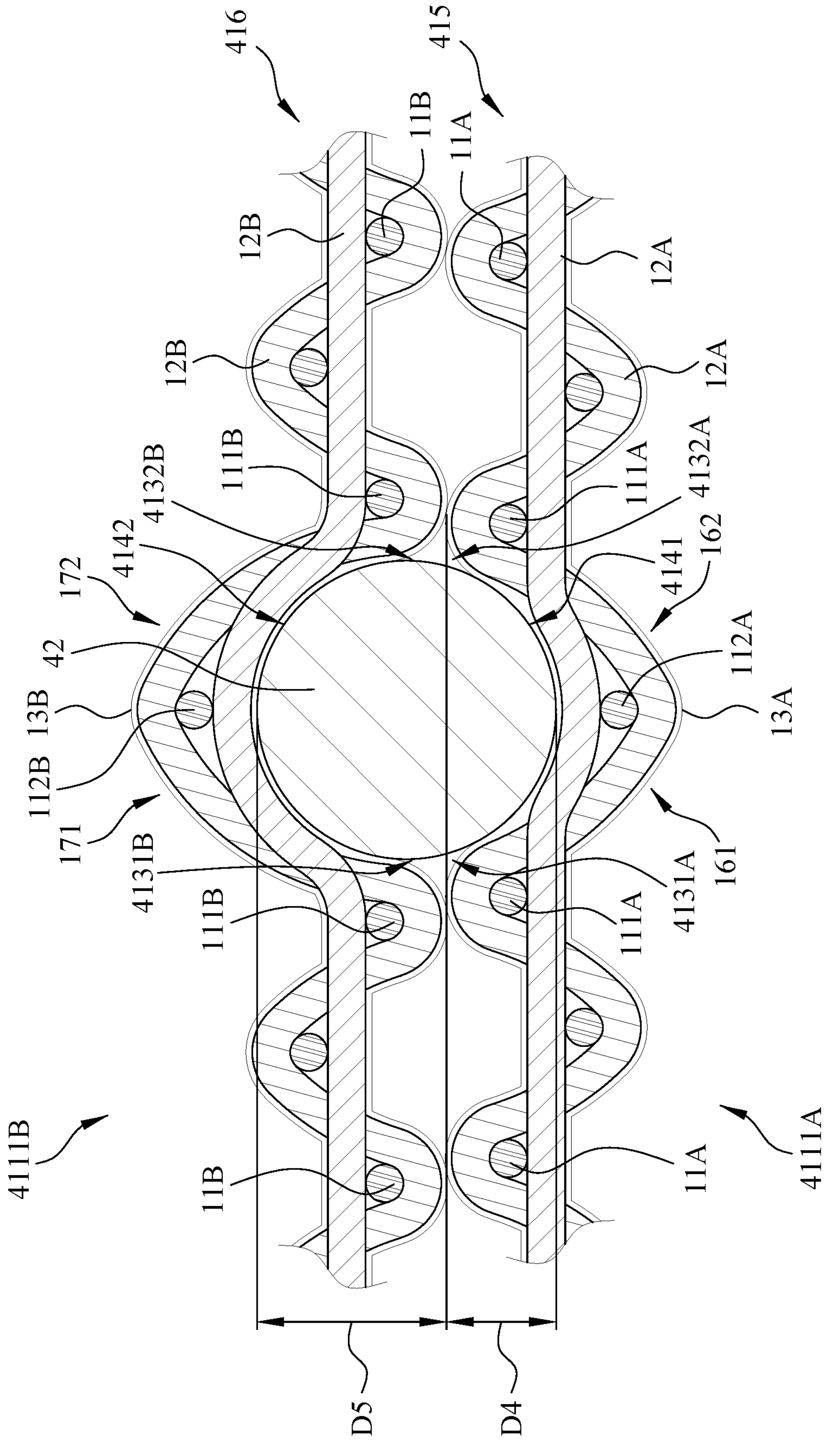
FIG. 14 is a cross-sectional view along line D-D of FIG. 12.
Figure 15:
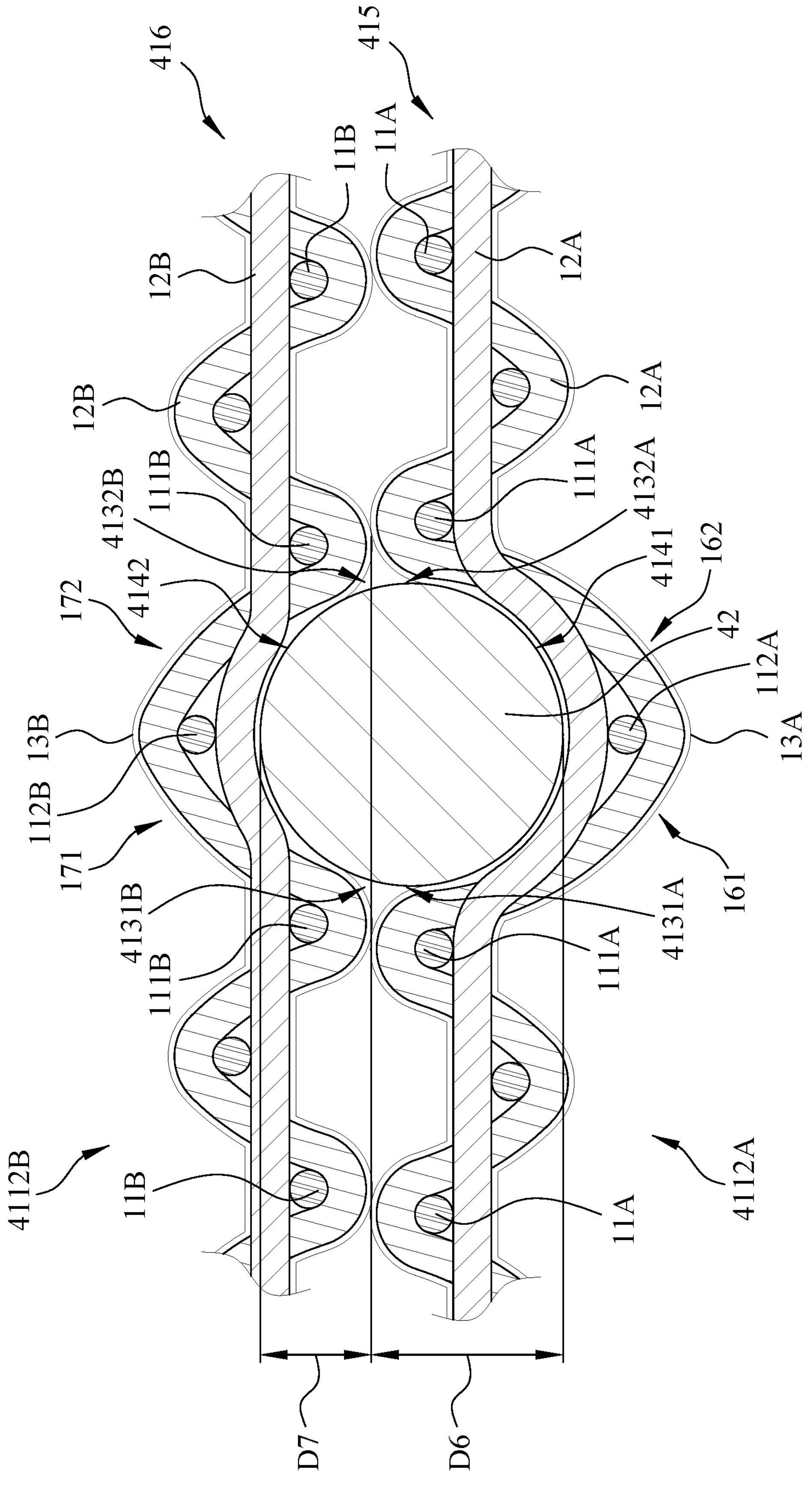
FIG. 15 is a cross-sectional view along line E-E of FIG. 12.
Figure 16:
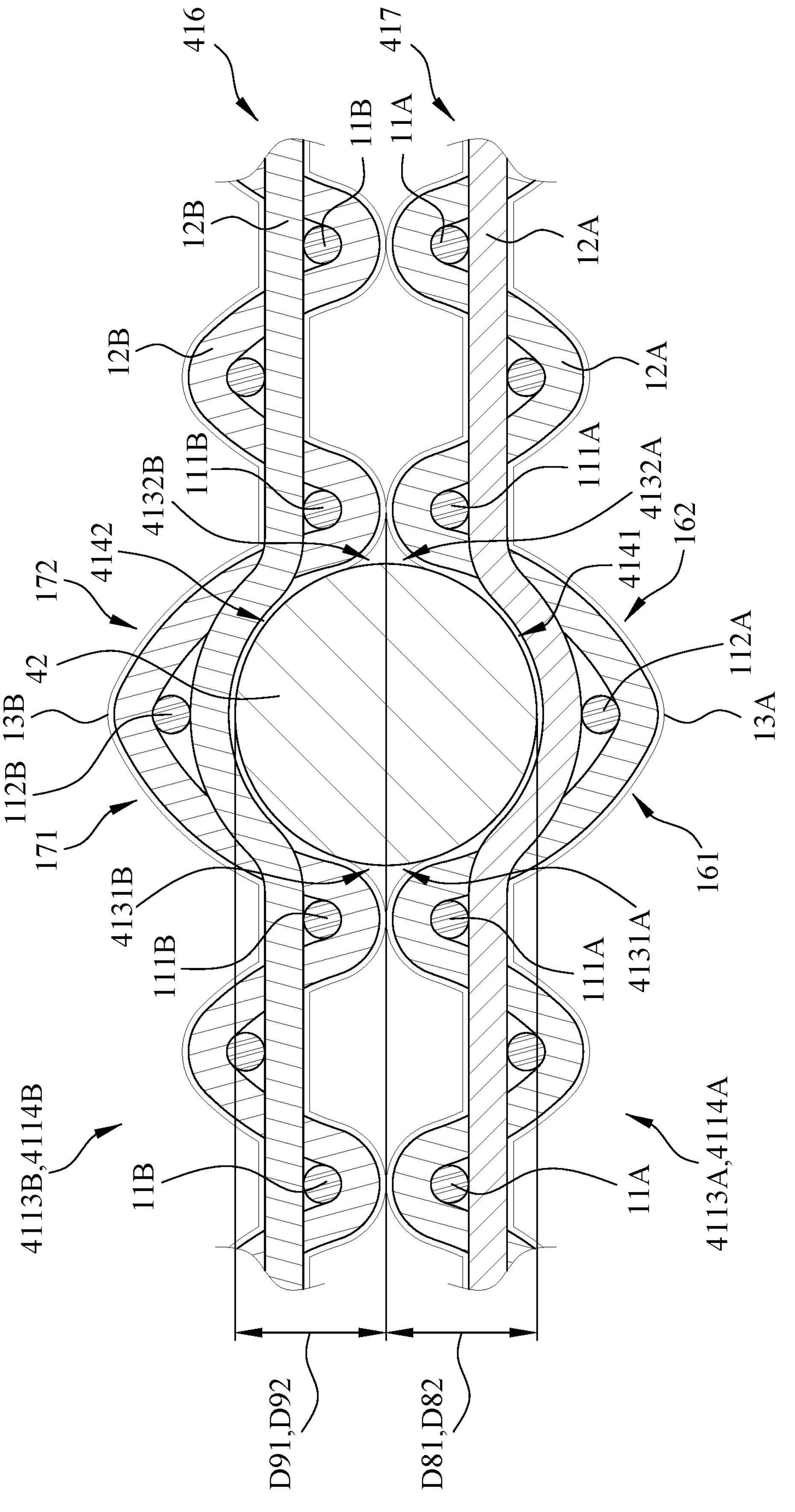
FIG. 16 is a cross-sectional view along line F1-F1 and line F2-F2 of FIG. 12.

In a forming step S5, as shown in FIG. 11B, When the upper mold 511 and the lower mold 512 fit together, the recesses of the upper mold 511 and the protrusions of the lower mold 512 press the first fabric 101 to form a plurality of first wave crests 4111A, and the recesses of the upper mold 511 and the protrusions of the lower mold 512 press second fabric 102 to form a plurality of second wave crests 4111B, while the recesses of the upper mold 511 and the protrusions of the lower mold 512 press the at least one wire 42; the protrusions of the upper mold 511 and the recesses of the lower mold 512 press the first fabric 101 to form a plurality of first wave troughs 4112A, and the protrusions of the upper mold 511 and the recesses of the lower mold 512 press the second fabric 102 to form a plurality of second wave troughs 4112B, while the protrusions of the upper mold 511 and the recesses of the lower mold 512 press the at least one wire 42; outer sides of the protrusions of the upper mold 511 and inner sides of the protrusions of the lower mold 512 press the first fabric 101 to form a plurality of first inner sidewalls 4113A, and the outer sides of the protrusions of the upper mold 511 and the inner sides of the protrusions of the lower mold 512 press the second fabric 102 to form a plurality of second inner sidewalls 4113B, while the outer sides of the protrusions of the upper mold 511 and the inner sides of the protrusions of the lower mold 512 press the at least one wire 42; inner sides of the protrusions of the upper mold 511 and outer sides of the protrusions of the lower mold 512 press the first fabric 101 to form a plurality of first outer sidewalls 4114A, and the inner sides of the protrusions of the upper mold 511 and the outer sides of the protrusions of the lower mold 512 press the second fabric 102 to form a plurality of second outer sidewalls 4114B, while the inner sides of the protrusions of the upper mold 511 and the outer sides of the protrusions of the lower mold 512 press the at least one wire 42; and the central flat portion of the upper mold 511 and the central flat portion of the lower mold 512 press the first fabric 101 to form a first center hole pre-formed area, and the central flat portion of the upper mold 511 and the central flat portion of the lower mold 512 press the second fabric 102 to form a second center hole pre-formed area. Each first wave crest 4111A, each first wave trough 4112A, each first inner sidewall 4113A and each first outer sidewall 4114A are formed with a first wave structure 411A, and each second wave crest 4111B, each second wave trough 4112B, each second inner sidewall 4113B and each second outer sidewall 4114B are formed with a second wave structure 411B. Under the pressure of the upper mold 511 and the lower mold 512, the at least one wire 42 further presses the at least one first wire disposing area 413A of the first fabric 101 to be recessed inwardly to form at least one first trench 4141, the at least one wire 42 further presses the at least one second wire disposing area 413B to be recessed inwardly to form at least one second trench 4142, the at least one first trench 4141 and the at least one second trench 4142 together form at least one hollow portion 414A, the at least one wire 42 stretches the first warp yarns 111A on two sides of the at least one first wire disposing area 413A toward outer sides, and the at least one wire 42 stretches the second warp yarns 111B on two sides of the at least one second wire disposing area 413B toward outer sides, so that the at least one wire 42 enters into the at least one hollow portion 414A immediately. Therefore, the first wave structures 411A, the first center hole pre-formed area and the at least one first wire disposing area 413A are formed with a first piece 415, the second wave structures 411B, the second center hole pre-formed area and the at least one second wire disposing area 413B are formed with a second piece 416, the first piece 415 is combined with the second piece 416 together and formed with a main body 41A, the at least one wire 42 extends in the at least one hollow portion 414A, and two ends of the at least one wire 42 respectively penetrate the inner and outer edges of the first piece 415 and the second piece 416, so that the main body 41A and the at least one wire 42 are formed with a wire damper 40A. The first wave structures 411A are sequentially arranged from the outer edge of the first piece 415 to the first center hole pre-formed area. The at least one first wire disposing area 413A extends radially from the outer edge of the first piece 415 through the first wave structures 411A to the first center hole pre-formed area. The second wave structures 411B are sequentially arranged from the outer edge of the second piece 416 to the second center hole pre-formed area. The at least one second wire disposing area 413B extends radially from the outer edge of the second piece 416 through the second wave structures 411B to the second center hole pre-formed area. As shown in FIGS. 14 to 16, after the at least one wire 42 stretches the first warp yarns 111A on two sides of the at least one first wire disposing area 413A toward outer sides, a first lower elastic adjustment area 161 is formed between a first warp yarn 111A closest to outside of a first side 4131A of the at least one first wire disposing area 413A and a first warp yarn 112A at inside of the at least one first wire disposing area 413A, a second lower elastic adjustment area 162 is formed between a first warp yarn 111A closest to outside of a second side 4132A of the at least one first wire disposing area 413A and the first warp yarn 112A at inside of the at least one first wire disposing area 413A, the widths of the first lower elastic adjustment area 161 and the second lower elastic adjustment area 162 are equal to each other, and the distances between the remaining first warp yarns 11A are less than the width of each of the first lower elastic adjustment area 161 and the second lower elastic adjustment area 162. As shown in FIGS. 14 to 16, after the at least one wire 42 stretches the second warp yarns 111B on two sides of the at least one second wire disposing area 413B toward outer sides, a first upper elastic adjustment area 171 is formed between a second warp yarn 111B closest to outside of a first side 4131B of the at least one second wire disposing area 413B and a second warp yarn 112B at inside of the at least one second wire disposing area 413B, a second upper elastic adjustment area 172 is formed between a second warp yarn 111B closest to outside of a second side 4132B of the at least one second wire disposing area 413B and the second warp yarn 112B at inside of the at least one second wire disposing area 413B, the widths of the first upper elastic adjustment area 171 and the second upper elastic adjustment area 172 are equal to each other, and the distances between the remaining second warp yarns 11B are less than the width of each of the first upper elastic adjustment area 171 and the second upper elastic adjustment area 172. As shown in FIGS. 14 to 16, after the at least one wire 42 stretches the first warp yarns 111A on two sides of the at least one first wire disposing area 413A toward outer sides, and after the at least one wire 42 stretches the second warp yarns 111B on two sides of the at least one second wire disposing area 413B toward outer sides, the depth D4 of the at least one first trench 4141 at the first wave crests 4111A is less than the depth D5 of the at least one second trench 4142 at the second wave crests 4111B, the depth D6 of the at least one first trench 4141 at the first wave troughs 4112A is greater than the depth D7 of the at least one second trench 4142 at the second wave troughs 4112B, the depth D81 of the at least one first trench 4141 at the first inner sidewalls 4113A is equal to the depth D91 of the at least one second trench 4142 at the second inner sidewalls 4113B, and the depth D82 of the at least one first trench 4141 at the first outer sidewalls 4114A is equal to the depth D92 of the at least one second trench 4142 at the second outer sidewalls 4114B. Preferably, as shown in FIGS. 14 and 15, the depth D4 of the at least one first trench 4141 at the first wave crests 4111A is equal to the depth D7 of the at least one second trench 4142 at the second wave troughs 4112B; and the depth D5 of the at least one second trench 4142 at the second wave crests 4111B is equal to the depth D6 of the at least one first trench 4141 at the first wave troughs 4112A. Also, as shown in FIG. 16, the depth D81 of the at least one first trench 4141 at the first inner sidewalls 4113A is equal to the depth D82 of the at least one first trench 4141 at the first outer sidewalls 4114A; and the depth D91 of the at least one second trench 4142 at the second inner sidewalls 4113B is equal to the depth D92 of the at least one second trench 4142 at the second outer sidewalls 4114B. In the second embodiment, the wire damper 40A includes four wires 42. The first piece 415 includes four first wire disposing areas 413A, and the second piece 416 includes four second wire disposing areas 413B. The wires 42 are respectively disposed at the first wire disposing areas 413A and the second wire disposing areas 413B. The first wire disposing areas 413A are recessed inwardly to form four first trenches 4141, the second wire disposing areas 413B are recessed inwardly to form four second trenches 4142, and the first trenches 4141 and the second trenches 4142 together form four hollow portions 414A. The wires 42 extend in the hollow portions 414A respectively. When the upper mold 511 and the lower mold 512 fit together and press the first fabric 101, the second fabric 102 and the at least one wire 42, the heating device is applied with electricity to increase the temperature of the upper mold 511 and the lower mold 512, thereby softening the resin on the first fabric 101 and the second fabric 102. In addition to destroying the resin structure, the resin also fills up in the gaps, and thus respective parts of the resin are connected with each other to form the final morphology of the solid resin layer 13. Therefore, the resin cover between the warp yarns 11 and the weft yarns 12.

In the cutting step S6, as shown in FIG. 11B, the wire damper 40A is cut from the base material 10A and both of the first center hole pre-formed area and the second center hole pre-formed area are cut out by the upper cutting tool 61 and the lower cutting tool 62, such that the wire damper 40A is separated from the base material 10A, and the wire damper 40A has a first center hole 412A and a second center hole 412B.

In an assembling step S7, as shown in FIG. 11B, the first center hole 412A and the second center hole 412B are both sleeved at a voice coil.

As shown in FIGS. 12 to 16, the present invention provides a loudspeaker 70A having a wire damper with locally adjustable elasticity, wherein the differences between the structures of the loudspeaker 70A of the second embodiment and the loudspeaker 70 of the first embodiment are as described above.

According to this, since the wires 42 are not fixedly adhered onto the surface of the yarns of the first fabric 101 when being disposed on the first fabric 101, when the wire damper 40 is formed on the base material 10 by thermoforming of the thermoforming device 50, the first wire disposing areas 413A and the second wire disposing areas 413B can be pressed by the wires 42, thereby recessing inwardly to form the first trenches 4141 and the second trenches 4142, and the first trenches 4141 and the second trenches 4142 can further forms the hollow portions 414A. It ensures that the wires 42 will not be damaged by the hot pressing of the thermoforming device 50. As a result, the manufactured wire damper 40 has a high yield and a low manufacturing cost.

Furthermore, by the first lower elastic adjustment areas 161 and the second lower elastic adjustment areas 162, the hardness, elasticity and toughness of the first wire disposing areas 413A can be adjusted; and by the first upper elastic adjustment areas 171 and the second upper elastic adjustment areas 172, the hardness, elasticity and toughness of the second wire disposing areas 413B can be adjusted. Therefore, the first wire disposing areas 413A and the second wire disposing areas 413B become softer, and their elasticity and toughness are increased. Thereby, the hardness, elasticity, and toughness of the combination of the first wire disposing areas 413A, the second wire disposing areas 413B and the wires 42 are equivalent to that of other areas of the main body 41A. Therefore, the wire damper 40A has uniform hardness, elasticity and toughness, thereby having uniform elastic resilience and fatigue resistance, and being not easy to be deformed and brittle, which improves the output sound quality of the loudspeaker.

In addition, the thermoforming device 50 must uniformly apply force to each wire 42 to ensure that each wire 42 will not be deformed due to being non-uniformly forced. However, the thermoforming device 50 requires larger pressing force to be able to form the first wave crests 4111A, the first wave troughs 4112A, the second wave crests 4111B and the second wave troughs 4112B by thermoforming. Also, the thermoforming device 50 requires less pressing force to be able to form the first inner sidewalls 4113A, the first outer sidewalls 4114A, the second inner sidewalls 4113B and the second outer sidewalls 4114B by thermoforming. Therefore, after the at least one wire 42 stretches the first warp yarns 111A on two sides of the at least one first wire disposing area 413A toward outer sides, and after the at least one wire 42 stretches the second warp yarns 111B on two sides of the at least one second wire disposing area 413B toward outer sides, the depth D4 of the first trenches 4141 at the first wave crests 4111A is less than the depth D5 of the second trenches 4142 at the second wave crests 4111B. The depth D6 of the first trenches 4141 at the first wave troughs 4112A is greater than the depth D7 of the second trenches 4142 at the second wave troughs 4112B. The depth D81 of the first trenches 4141 at the first inner sidewalls 4113A is equal to the depth D91 of the second trenches 4142 at the second inner sidewalls 4113B. The depth D82 of the first trenches 4141 at the first outer sidewalls 4114A is equal to the depth D92 of the second trenches 4142 at the second outer sidewalls 4114B. In other words, the depths of the hollow portions 414A are non-uniform. Since the hollow portions 414A with non-uniform depth allow the wires 42 to extend therein in an non-uniform arrangement manner, the thermoforming device 50 can uniformly apply force to each wire 42, such that the wires 42 can maintain their original shape and will not be deformed, thereby improving the output sound quality of the loudspeaker. Under the condition that the wires 42 maintain their original shapes, the diameter of the hollow portions 414A in the space between the first wave crests 4111A and the second wave crests 4111B is equal to the diameter of the wires 42; the diameter of the hollow portions 414A in the space between the first wave troughs 4112A and the second wave troughs 4112B is equal to the diameter of the wires 42; the diameter of the hollow portions 414A in the space between the first inner sidewalls 4113A and the second inner sidewalls 4113B is equal to the diameter of the wires 42; and the diameter of the hollow portions 414A in the space between the first outer sidewalls 4114A and the second outer sidewalls 4114B is equal to the diameter of the wires 42.

In addition, the depth D4 of the first trenches 4141 at the first wave crests 4111A is equal to the depth D7 of the second trenches 4142 at the second wave troughs 4112B, and the depth D5 of the second trenches 4142 at the second wave crests 4111B is equal to the depth D6 of the first trenches 4141 at the first wave troughs 4112A, such that the diameter of the hollow portions 414A in the space between the first wave crests 4111A and the second wave crests 4111B is equal to the diameter of the hollow portions 414A in the space between the first wave troughs 4112A and the second wave troughs 4112B. Furthermore, the depth D81 of the first trenches 4141 at the first inner sidewalls 4113A is equal to the depth D82 of the first trenches 4141 at the first outer sidewalls 4114A, and the depth D91 of the second trenches 4142 at the second inner sidewalls 4113B is equal to the depth D92 of the second trenches 4142 at the second outer sidewalls 4114B, such that the diameter of the hollow portions 414A in the space between the first inner sidewalls 4113A and the second inner sidewalls 4113B is equal to the diameter of the hollow portions 414A in the space between the first outer sidewalls 4114A and the second outer sidewalls 4114B. Therefore, the wire damper 40A has a more balanced overall structure with uniform hardness, elasticity and toughness, thereby having uniform elastic resilience and fatigue resistance, and being not easy to be deformed and brittle, which improves the output sound quality of the loudspeaker.

It is noted that since the wires 42 are sandwiched by the first fabric 101 and the second fabric 102, they will not contact with the thermoforming device 50, which ensures that the wires 42 will not be damaged by the hot pressing of the thermoforming device 50. As a result, the manufactured wire damper 40A has a high yield and a low manufacturing cost.

The mentioned above are only preferred embodiments for explaining the present invention but intend to limit the present invention in any forms, so that any modifications or verification relating to the present invention made in the same spirit of the invention should still be included in the scope of the invention as intended to be claimed.

What is claimed is:

1. A method for manufacturing a loudspeaker having a wire damper with locally adjustable elasticity, comprising the following steps in sequence:

a preparation step preparing a base material, which is a single-layer fabric structure and is formed by interweaving a plurality of warp yarns and a plurality of weft yarns;

an impregnating step impregnating the base material in a resin solution;

a drying step drying the base material to form a solid resin layer on the base material;

a wire disposing step disposing at least one wire on at least one wire disposing area of the base material;

a forming step hot pressing the base material and the at least one wire; wherein the base material is formed with a plurality of wave structures and a center hole pre-formed area; wherein the at least one wire further presses the at least one wire disposing area of the base material to be recessed inwardly to form at least one hollow portion, and the at least one wire stretches the warp yarns on two sides of the at least one wire disposing area toward outer sides, so that the at least one wire enters into the at least one hollow portion immediately; wherein the wave structures, the center hole pre-formed area and the at least one wire disposing area are formed with a main body, the at least one wire extends in the at least one hollow portion, and two ends of the at least one wire respectively penetrate inner and outer edges of the main body, so that the main body and the at least one wire are formed with a wire damper; wherein the wave structures are sequentially arranged from an outer edge of the main body to the center hole pre-formed area, each wave structure includes a wave crest, a wave trough, an inner sidewall and an outer sidewall, and the at least one wire disposing area extends radially from the outer edge of the main body through the wave structures to the center hole pre-formed area; wherein after the at least one wire stretches the warp yarns on two sides of the at least one wire disposing area toward outer sides, a first elastic adjustment area is formed between the warp yarn closest to outside of a first side of the at least one wire disposing area and the warp yarn at inside of the at least one wire disposing area, a second elastic adjustment area is formed between the warp yarn closest to outside of a second side of the at least one wire disposing area and the warp yarn at the inside of the at least one wire disposing area, widths of the first elastic adjustment area and the second elastic adjustment area are equal to each other, and distances between the remaining warp yarns are less than the width of each of the first elastic adjustment area and the second elastic adjustment area; and wherein after the at least one wire stretches the warp yarns on two sides of the at least one wire disposing area toward outer sides, each of depths of the at least one hollow portion at the inner sidewalls and the outer sidewalls is less than a depth of the at least one hollow portion at the wave crests, and each of the depths of the at least one hollow portion at the inner sidewalls and the outer sidewalls is less than a depth of the at least one hollow portion at the wave troughs;

a cutting step cutting the wire damper from the base material and cutting out the center hole pre-formed area, such that the wire damper is separated from the base material, and the wire damper has a center hole; and an assembling step, in which a voice coil is movably disposed in a loudspeaker body, the center hole of the wire damper is sleeved at the voice coil, and the at least one wire of the wire damper is connected to the voice coil, so as to assemble a loudspeaker.

2. The method according to claim 1, wherein in the forming step, the depth of the at least one hollow portion at the wave crests is equal to the depth of the at least one hollow portion at the wave troughs, and the depth of the at least one hollow portion at the inner sidewalls is equal to the depth of the at least one hollow portion at the outer sidewalls.

3. A method for manufacturing a loudspeaker having a wire damper with locally adjustable elasticity, comprising the following steps in sequence:

a preparation step preparing a base material, which is a double-layer fabric structure and includes a first fabric and a second fabric, the first fabric is formed by interweaving a plurality of first warp yarns and a plurality of first weft yarns, the second fabric is formed by interweaving a plurality of second warp yarns and a plurality of second weft yarns;

an impregnating step impregnating the first fabric and the second fabric in a resin solution, respectively;

a drying step drying the first fabric and the second fabric, so as to form a first solid resin layer on the first fabric, and to form a second solid resin layer on the second fabric;

a wire disposing step, in which at least one wire is first disposed on at least one first wire disposing area of the first fabric, the second fabric is then disposed on the first fabric, at least one wire is disposed on at least one second wire disposing area of the second fabric, and the at least one first wire disposing area corresponds to the at least one second wire disposing area;

a forming step hot pressing the first fabric, the second fabric and the at least one wire; wherein the first fabric is formed with a plurality of first wave structures and a first center hole pre-formed area, and the second fabric is formed with a plurality of second wave structures and a second center hole pre-formed area; wherein the at least one wire further presses the at least one first wire disposing area of the first fabric to be recessed inwardly to form at least one first trench, the at least one wire further presses the at least one second wire disposing area to be recessed inwardly to form at least one second trench, the at least one first trench and the at least one second trench together form at least one hollow portion, the at least one wire stretches the first warp yarns on two sides of the at least one first wire disposing area toward outer sides, and the at least one wire stretches the second warp yarns on two sides of the at least one second wire disposing area toward outer sides, so that the at least one wire enters into the at least one hollow portion immediately; wherein the first wave structures, the first center hole pre-formed area and the at least one first wire disposing area are formed with a first piece, the second wave structures, the second center hole pre-formed area and the at least one second wire disposing area are formed with a second piece, the first piece is combined with the second piece together and formed with a main body, the at least one wire extends in the at least one hollow portion, and two ends of the at least one wire respectively penetrate inner and outer edges of the first piece and the second piece, so that the main body and the at least one wire are formed with a wire damper; wherein the first wave structures are sequentially arranged from an outer edge of the first piece to the first center hole pre-formed area, each first wave structure includes a first wave crest, a first wave trough, a first inner sidewall and a first outer sidewall, the at least one first wire disposing area extends radially from the outer edge of the first piece through the first wave structures to the first center hole pre-formed area; wherein the second wave structures are sequentially arranged from an outer edge of the second piece to the second center hole pre-formed area, each second wave structure includes a second wave crest, a second wave trough, a second inner sidewall and a second outer sidewall, the at least one second wire disposing area extends radially from the outer edge of the second piece through the second wave structures to the second center hole pre-formed area; wherein after the at least one wire stretches the first warp yarns on two sides of the at least one first wire disposing area toward outer sides, a first lower elastic adjustment area is formed between the first warp yarn closest to outside of a first side of the at least one first wire disposing area and the first warp yarn at inside of the at least one first wire disposing area, a second lower elastic adjustment area is formed between the first warp yarn closest to outside of a second side of the at least one first wire disposing area and the first warp yarn at the inside of the at least one first wire disposing area, widths of the first lower elastic adjustment area and the second lower elastic adjustment area are equal to each other, and distances between the remaining first warp yarns are less than the width of each of the first lower elastic adjustment area and the second lower elastic adjustment area; wherein after the at least one wire stretches the second warp yarns on two sides of the at least one second wire disposing area toward outer sides, a first upper elastic adjustment area is formed between the second warp yarn closest to outside of a first side of the at least one second wire disposing area and the second warp yarn at inside of the at least one second wire disposing area, a second upper elastic adjustment area is formed between the second warp yarn closest to outside of a second side of the at least one second wire disposing area and the second warp yarn at the inside of the at least one second wire disposing area, widths of the first upper elastic adjustment area and the second upper elastic adjustment area are equal to each other, and distances between the remaining second warp yarns are less than the width of each of the first upper elastic adjustment area and the second upper elastic adjustment area; and wherein after the at least one wire stretches the first warp yarns on two sides of the at least one first wire disposing area toward outer sides, and after the at least one wire stretches the second warp yarns on two sides of the at least one second wire disposing area toward outer sides, a depth of the at least one first trench at the first wave crests is less than a depth of the at least one second trench at the second wave crests, a depth of the at least one first trench at the first wave troughs is greater than a depth of the at least one second trench at the second wave troughs, a depth of the at least one first trench at the first inner sidewalls is equal to a depth of the at least one second trench at the second inner sidewalls, a depth of the at least one first trench at the first outer sidewalls is equal to a depth of the at least one second trench at the second outer sidewalls;

a cutting step cutting the wire damper from the base material and cutting out both of the first center hole pre-formed area and the second center hole pre-formed area, such that the wire damper is separated from the base material, and the wire damper has a first center hole and a second center hole; and an assembling step, in which a voice coil is movably disposed in a loudspeaker body, the first center hole and the second center hole of the wire damper are sleeved at the voice coil, and the at least one wire of the wire damper is connected to the voice coil, so as to assemble a loudspeaker.

4. The method according to claim 3, wherein in the forming step, the depth of the at least one first trench at the first wave crests is equal to the depth of the at least one second trench at the second wave troughs, the depth of the at least one second trench at the second wave crests is equal to the depth of the at least one first trench at the first wave troughs, the depth of the at least one first trench at the first inner sidewalls is equal to the depth of the at least one first trench at the first outer sidewalls, and the depth of the at least one second trench at the second inner sidewalls is equal to the depth of the at least one second trench at the second outer sidewalls.

* * * * *